(12) United States Patent
Nogi et al.

(10) Patent No.: US 9,175,142 B2
(45) Date of Patent: Nov. 3, 2015

(54) TRANSPORTATION METHOD FOR WATER-ABSORBING RESIN POWDER SUBSTANCE

(75) Inventors: Kozo Nogi, Himeji (JP); Masatoshi Nakamura, Himeji (JP); Koji Matsumoto, Himeji (JP); Kazuma Awai, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 858 days.

(21) Appl. No.: 12/935,052

(22) PCT Filed: Mar. 26, 2009

(86) PCT No.: PCT/JP2009/056159
§ 371 (c)(1),
(2), (4) Date: Dec. 13, 2010

(87) PCT Pub. No.: WO2009/119756
PCT Pub. Date: Oct. 1, 2009

(65) Prior Publication Data
US 2011/0088806 A1   Apr. 21, 2011

(30) Foreign Application Priority Data

Mar. 28, 2008 (JP) .................................. 2008-086570
Apr. 28, 2008 (JP) .................................. 2008-117167
Sep. 22, 2008 (JP) .................................. 2008-242697

(51) Int. Cl.
*B65G 53/00* (2006.01)
*C08J 3/12* (2006.01)

(52) U.S. Cl.
CPC ................ *C08J 3/12* (2013.01); *C08J 2333/02* (2013.01)

(58) Field of Classification Search
USPC ............................ 406/93, 122, 154, 197, 198
See application file for complete search history.

(56) References Cited

U.S. PATENT DOCUMENTS

| 4,281,946 | A | * | 8/1981 | Kanics ............................ 406/95 |
| 4,900,200 | A | * | 2/1990 | Harumoto et al. .............. 406/93 |
| 4,985,518 | A | * | 1/1991 | Alexander et al. ............. 526/240 |
| 6,582,161 | B2 | * | 6/2003 | Noguki ......................... 406/197 |

(Continued)

FOREIGN PATENT DOCUMENTS

| JP | A-64-013330 | 1/1989 |
| JP | A-04-075918 | 3/1992 |

(Continued)

OTHER PUBLICATIONS

Supplemental European Search Report for European Application No. 09724168 dated Oct. 7, 2011, 5 pages.

*Primary Examiner* — Joseph Dillon, Jr.
(74) *Attorney, Agent, or Firm* — Cesari and McKenna, LLP

(57) ABSTRACT

[PROBLEM] Provided is a transportation method for a water-absorbing resin powder substance, which is capable of suppressing property decrease of the water-absorbing resin powder substance while suppressing blocking phenomenon and is suitable for long distance transportation.
[SOLUTION] The present invention is a transportation method for a water-absorbing resin powder substance during a production step by pneumatic transportation via a transportation pipeline. In this transportation method, two or more pneumatic transportation apparatuses (A, B, C) are provided in one transportation section, and these pneumatic transportation apparatuses (A, B, C) are connected by the transportation pipelines (P1, P2, P3) in series.

20 Claims, 8 Drawing Sheets

(56) References Cited

U.S. PATENT DOCUMENTS

| | | | |
|---|---|---|---|
| 6,727,345 B2* | 4/2004 | Kajikawa et al. | 528/502 R |
| 6,817,557 B2* | 11/2004 | Kakita et al. | 241/23 |
| 7,727,586 B2* | 6/2010 | Bruhns et al. | 427/213 |
| 8,148,485 B2* | 4/2012 | Nogi et al. | 526/317.1 |
| 8,360,691 B2* | 1/2013 | Moretto | 406/17 |
| 8,410,223 B2* | 4/2013 | Matsumoto et al. | 525/330.2 |
| 8,591,152 B2* | 11/2013 | Funk et al. | 406/197 |
| 8,596,931 B2* | 12/2013 | Nagashima et al. | 406/197 |
| 8,703,859 B2* | 4/2014 | Kitano et al. | 524/492 |
| 8,791,230 B2* | 7/2014 | Matsumoto et al. | 528/481 |
| 2001/0046420 A1* | 11/2001 | Noguki | 406/197 |
| 2002/0187012 A1* | 12/2002 | Grasshoff | 406/95 |
| 2003/0020199 A1* | 1/2003 | Kajikawa et al. | 264/140 |
| 2007/0225160 A1* | 9/2007 | Kitano et al. | 502/402 |
| 2007/0274789 A1* | 11/2007 | DeBruin et al. | 406/197 |
| 2009/0022603 A1* | 1/2009 | Feise et al. | 417/55 |
| 2009/0060660 A1* | 3/2009 | Funk et al. | 406/197 |
| 2009/0060661 A1* | 3/2009 | Feise et al. | 406/197 |
| 2010/0119312 A1* | 5/2010 | Nagashima et al. | 406/46 |
| 2010/0249320 A1* | 9/2010 | Matsumoto et al. | 524/832 |
| 2011/0028670 A1* | 2/2011 | Matsumoto et al. | 526/317.1 |
| 2011/0166300 A1* | 7/2011 | Dairoku et al. | 525/384 |
| 2011/0293380 A1* | 12/2011 | Stuke et al. | 406/22 |
| 2012/0184684 A1* | 7/2012 | Funk et al. | 525/344 |
| 2012/0196987 A1* | 8/2012 | Funk et al. | 525/344 |
| 2012/0231162 A1* | 9/2012 | Weismantel et al. | 427/222 |
| 2012/0298915 A1* | 11/2012 | Okuda et al. | 252/194 |
| 2013/0066019 A1* | 3/2013 | Okuda et al. | 525/329.7 |
| 2014/0027943 A1* | 1/2014 | Hoshika | 264/121 |
| 2014/0197360 A1* | 7/2014 | Kitano et al. | 252/194 |

FOREIGN PATENT DOCUMENTS

| | | |
|---|---|---|
| WO | 2007/104673 | 9/2007 |
| WO | 2007/104676 | 9/2007 |

\* cited by examiner

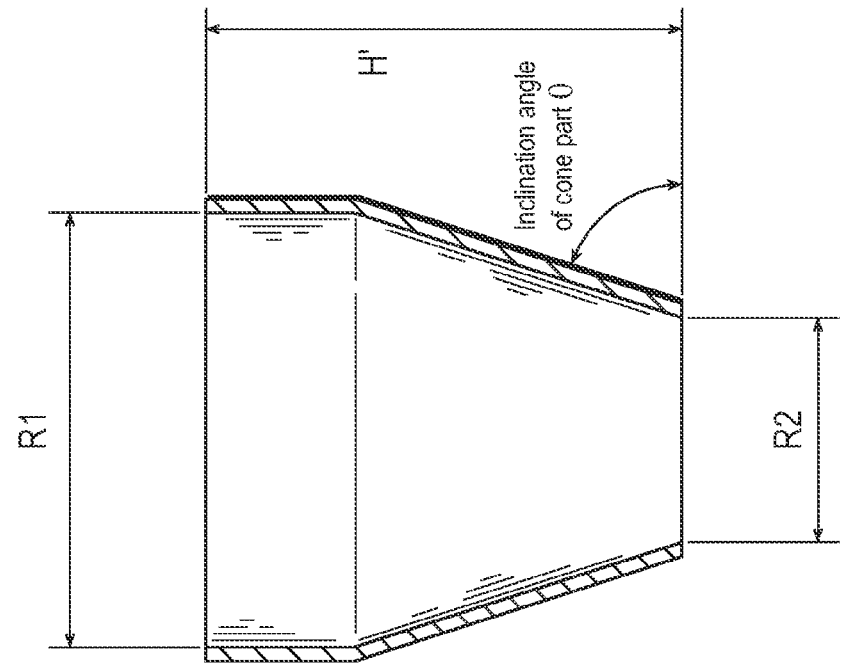
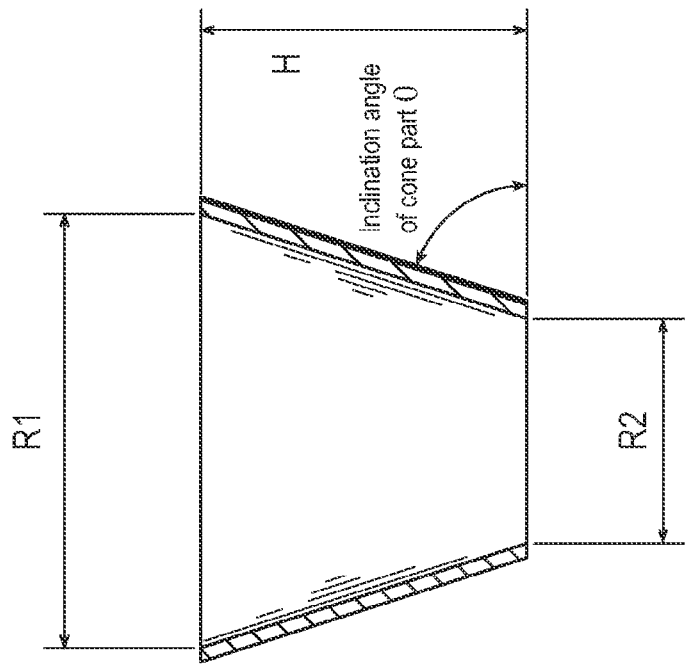
FIG.3

TRANSPORTATION METHOD FOR WATER-ABSORBING RESIN POWDER SUBSTANCE

CROSS REFERENCE TO RELATED APPLICATIONS

This application is a National Stage of International Application No. PCT/JP2009/056159, filed on Mar. 26, 2009, which claims the priority of Japanese Application No. 2008-086570 filed Mar. 28, 2008, Japanese Application No. 2008-117167 filed Apr. 28, 2008, Japanese Application No. 2008-242697 filed Sep. 22, 2008. The content of the prior application mentioned above is incorporated herein by reference in its entirety.

TECHNICAL FIELD

The present invention relates to a transportation method for a water-absorbing resin powder substance.

BACKGROUND ART

In recent years, in hygiene products such as disposable diapers, sanitary napkins and incontinent pads, the water-absorbing resin as a composition material thereof has been widely used, in view of absorbing body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, however, it is generally used after converted to a powder-like form (particulate). As such powders (particles), for example, the particulate water-absorbing agent, having a weight average particle diameter thereof of about 200 to 800 μm, is used widely.

The particulate water-absorbing agent is produced via the drying step, the crushing step, the classification step, the surface cross-linking step, and the like. In an industrial scale production, a transportation apparatus is used for transportation between apparatuses performing each step. As a transportation system, mechanical transportation and pneumatic transportation are included. In mechanical transportation, for example, a conveyor is used as the transportation apparatus.

The pneumatic transportation has many merits as compared with the mechanical transportation. As merits of the pneumatic transportation, less mechanical troubles caused by less mechanical parts, superiority in durability, a return line not necessary different from a belt conveyer, that is, one way, less commingling of foreign materials and the like are included.

A system of pneumatic transportation is largely classified to pneumatic transportation in low concentration and pneumatic transportation in high concentration. In pneumatic transportation in low concentration, a powder substance to be transported is in a dispersed state inside a transportation pipeline. In pneumatic transportation in high concentration, a powder substance to be transported moves inside the transportation pipeline while forming a group called a slag or a plug. Because high air flow velocity is required for the powder substance to maintain a dispersed state, pneumatic transportation in low concentration is high velocity transportation. On the other hand, pneumatic transportation in high concentration is low velocity transportation.

During pneumatic transportation, collision or friction may occur in particles themselves of a substance to be transported (powder substance). In addition, in pneumatic transportation, the powder substance may collide with a pipeline. In addition, collision or friction may occur between the powder substance and the pipeline. The powder substance may be worn or broken during pneumatic transportation. Pneumatic transportation may give influence on property of the water-absorbing resin powder substance. Therefore, pneumatic transportation which is capable of suppressing property decrease of the powder substance is required.

In JP-A-2004-345804, a transportation method which is capable of suppressing property decrease has been disclosed for the water-absorbing resin powder substance containing a polyhydric alcohol. In Patent Documents 2 to 4, a pneumatic transportation method for the water-absorbing resin has been disclosed where property decrease during transportation is low. In order to attain such an object, Patent Document 2 has specified curvature radius of a pipeline to equal to or higher than 5 times pipeline diameter, and Patent Document 3 has specified gas speed and solid-gas ratio, as well as Patent Document 4 has specified Froude number. Still more, Patent Document 5 has disclosed an aggregation prevention method for the water-absorbing resin during transportation, by heating or retaining heat of an apparatus, and has disclosed pneumatic transportation as an example of a transportation method.

PRIOR DOCUMENTS

Patent Document 1: JP-A-2004-345804
Patent Document 2: WO 2007/104657 pamphlet
Patent Document 3: WO 2007/104673 pamphlet
Patent Document 4: WO 2007/104676 pamphlet
Patent Document 5: U.S. Pat. No. 6,817,557 specification

SUMMARY OF THE INVENTION

Problem to be Solved by the Invention

The present inventors have discovered a novel transportation method which is capable of suppressing property decrease in pneumatic transportation, based on a technological idea different from a conventional one.

In addition, as other problem relating to pneumatic transportation, blocking phenomenon (clogging) is included. Generation of the blocking phenomenon stops transportation. Frequent generation of the blocking phenomenon decreases transportation efficiency.

It is an object of the present invention to provide a transportation method for the water-absorbing resin powder substance, which is capable of suppressing property decrease of the water-absorbing resin powder substance while suppressing blocking phenomenon and is suitable for long distance transportation.

Means for Solving the Problem

The transportation method relevant to the present invention is a transportation method for the water-absorbing resin powder substance during a production step by pneumatic transportation via a production pipeline. In this transportation method, two or more pneumatic transportation apparatuses are used in one transportation section (multi-stage pneumatic transportation), and these pneumatic transportation apparatuses are connected by the transportation pipeline in series.

Preferably, total length Lt of the transportation pipelines included in the one transportation section is equal to or longer than 50 m.

Preferably, length Lp of each transportation pipeline included in the one transportation section is equal to or shorter than 40 m.

Preferably, linear velocity at a terminal of the transportation pipeline of the water-absorbing resin powder substance is equal to or lower than 15 m/s.

Preferably, the pneumatic transportation apparatus has a pressurized tank and a receiving hopper.

Preferably, a valve is provided between the pressurized tank and the receiving hopper.

Preferably, open-close of the valve and start up of the pneumatic transportation apparatus are automatically controlled, based on detection result of a powder level of the receiving hopper. Preferably, open-close of the valve and start up of the pneumatic transportation apparatus are automatically controlled, based on detection result of pressure in the pressurized tank (which may also be referred to as "pressurized tank hopper". Preferably, pressure inside the pressurized tank in a pressurized state is set at 0.05 to 0.7 MPa.

Preferably, total length Lt of the transportation pipelines included in the one transportation section is equal to or longer than 100 m.

Preferably, the pneumatic transportation apparatus is a pneumatic transportation apparatus in high concentration.

Preferably, transportation amount of the water-absorbing resin powder substance is equal to or higher than 1000 kg/hr.

Preferably, the water-absorbing resin powder substance has been surface cross-linked with a polyhydric alcohol.

Preferably, the water-absorbing resin powder substance contains a polyvalent metal salt.

Preferably, the water-absorbing resin powder substance contains an inorganic particle.

Preferably, saline flow conductivity (SFC) for 0.69% by mass normal saline solution, of the water-absorbing resin powder substance before and after transportation is equal to or larger than 10 $(\times 10^{-7} \cdot cm^3 \cdot s \cdot g^{-1})$. It should be noted that, "the water-absorbing resin powder substance after transportation" means the water-absorbing resin powder substance just after the transportation by the present invention is performed, and when the transportation of the present invention is performed at an intermediate stage of the production step of the water-absorbing resin powder substance, it means the water-absorbing resin powder substance (an intermediate) just after the transportation in this intermediate stage is performed. It has been shown that the transportation method of the present invention suppresses damage of the water-absorbing resin powder substance by specifying property after transportation.

Preferably, the water-absorbing resin powder substance is an irregular pulverized shaped polyacrylic acid (salt)-based water-absorbing resin obtained by continuous belt polymerization or continuous kneader polymerization.

Preferably, the water-absorbing resin powder substance is a polyacrylic acid (salt)-based water-absorbing resin obtained by a production step including a fine powder recycling step.

Preferably, the water-absorbing resin powder substance is a polyacrylic acid (salt)-based water-absorbing resin made by being surface cross-linked at 150 to 250° C.

Advantages of the Invention

According to the present invention, by arranging a plurality of transportation apparatuses in series, even when the transportation section is long, the transportation pipeline can be made short. As a result, blocking phenomenon can be suppressed while suppressing linear velocity of the water-absorbing resin powder substance. In addition, by suppressing linear velocity of the water-absorbing resin powder substance, property decrease of the water-absorbing resin powder substance can be suppressed. Such effects appear significantly for the water-absorbing resin powder substance obtained, in particular, by a specific production step (polymerization, surface cross-linking, addition of the additives, fine powder recycling or the like).

BRIEF DESCRIPTION OF THE DRAWINGS

FIG. 3 is a schematic view showing maximum caliber part (R1) of the upper part of a hopper, and caliber (R2) and height (H) of the discharging part of the hopper, specifying ratio of cone part inclination angle and drawing rate, and ratio of maximum caliber (diameter) and height of the hopper, relating to the hopper which can be used in one embodiment of the present invention.

FIG. 4 is shown somewhat in detail.

BEST MODE FOR CARRYING OUT THE INVENTION

Figure 1:
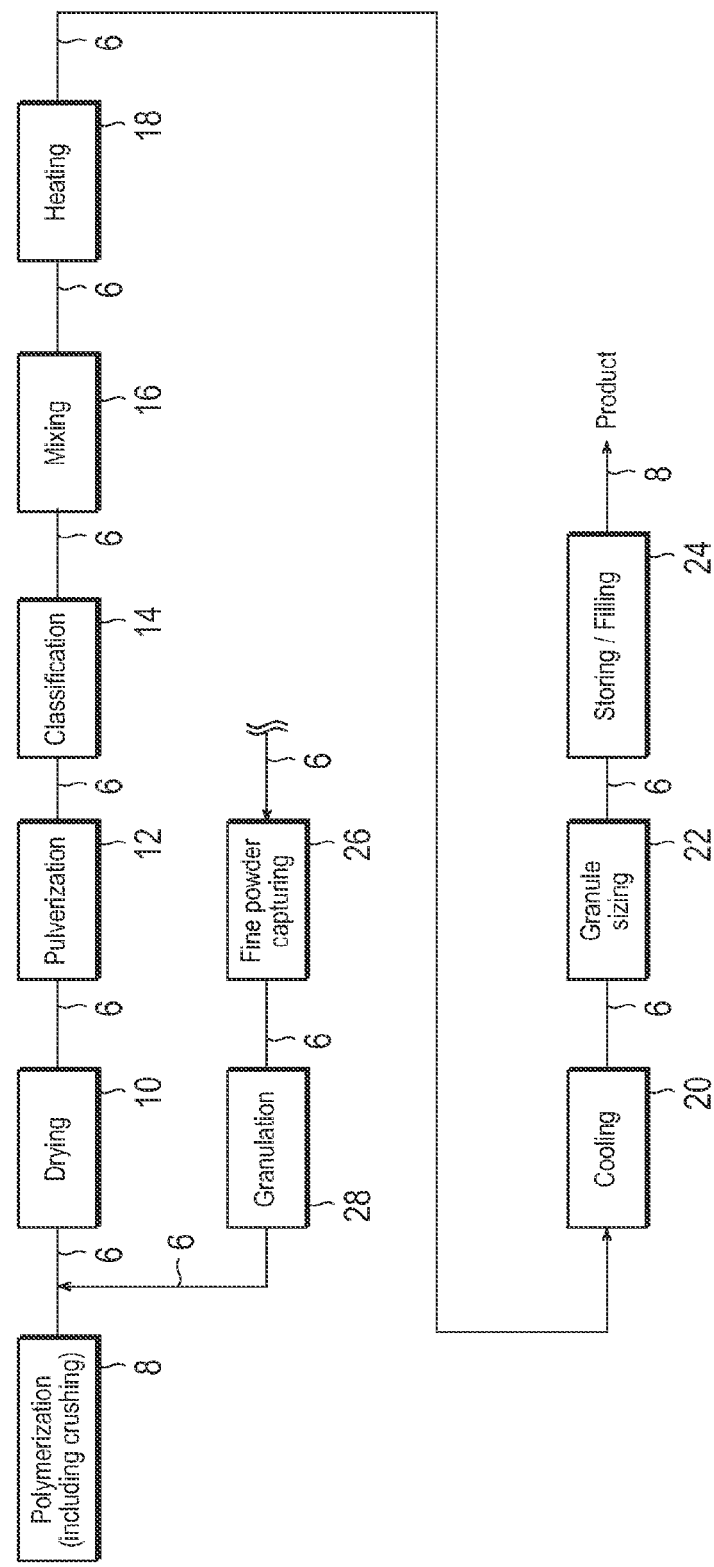
FIG. 1 is a schematic configuration view showing a production facility to be used to produce a water-absorbing resin (another name; a particulate water-absorbing agent).

The present invention relates to the transportation method for the water-absorbing resin powder substance in the production step of the particulate water-absorbing agent. In the present description, "the water-absorbing resin" means a water swelling and water insoluble polymer gelling agent. Absorbency (CRC) is essentially equal to or higher than 5 g/g, preferably 10 to 100 g/g, and further preferably 20 to 80 g/g. In addition, extractable is essentially 0 to 50% by weight, preferably 0 to 30% by weight, further preferably 0 to 20% by weight, and particularly preferably 0 to 10% by weight.

It should be noted that, the water-absorbing resin is not limited to a form where whole amount (100%) is a polymer, and may include additives and the like (to be described later), in a range to maintain the performance. That is, even for the particulate water-absorbing agent (a water-absorbing resin composition), it is called generally the water-absorbing resin in the present invention. In the present invention, when the water-absorbing resin is the particulate water-absorbing agent (the water-absorbing res in composition), content of the water-absorbing resin (a polyacrylic acid (salt)-based water-absorbing resin) relevant to the present invention is preferably 70 to 99.9% by weight, more preferably 80 to 99.7% by weight, and still more preferably 90 to 99.5% by weight, relative to total amount. As components other than the water-absorbing resin, in view of water absorbing speed or impact resistance of the powders (particles), water is preferable, and the additives to be described later are contained as needed.

In the present description, "polyacrylic acid (salt)" means a polymer having acrylic acid (salt) as a principal component, as a repeating unit. Specifically, it contains acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, and further preferably an alkali metal salt or an ammonium salt, particularly preferably the alkali metal salt, and further a sodium salt.

"EDANA" is an abbreviation of European Disposables and Nonwovens Association. As for detail of the measurement method (ERT/EDANA Recommended Test Methods) for the water-absorbing resin of a European standard (nearly a world standard), refer to the ERT original, which is known document (revised in 2002).

In the present description, "a water-containing gel-like polymer (water-containing gel)", "a dried substance" and "the water-absorbing resin powder substance (a powder substance)" are defined as follows.

"The water-containing gel-like polymer (water-containing gel; polymer gel)" indicates a water-containing gel-like cross-linked polymer of the water-absorbing resin. As a representative, it means water-containing gel obtained in a polymerization step. Usually it indicates a polymer having a water content rate of equal to or higher than 30% by weight.

"The dried substance" indicates a dried polymer of the water-absorbing resin via a drying step. It usually indicates a dried polymer having a water content rate in the drying step of below 30% by weight, and still more below 20% by weight, although it depends on the water content rate after polymerization. Shape thereof is not limited and drying may be performed at the same time as polymerization (drying by polymerization heat or by heating at polymerization or the like).

"The water-absorbing resin powder substance (a powder substance)" means a solid having a certain fluidity as powders, for example, it means a solid whose Flow Rate (ERT450.2-02) can be measured, or a solid which can be sieve classified by (ERT420.2-02). More specifically, it means a solid whose particle diameter is equal to or shorter than 5 mm defined by sieve classification and powders of the dried polymer of the water-absorbing resin, or powders used as a solid as it is among raw materials or the additives of the water-absorbing resin (for example, water-insoluble inorganic powders, polyvalent metal salt powders or hydrate salts thereof and the like). Water content rate is not limited as long as it is a solid, however, usually below 30% by weight, and still more equal to or lower than 20% by weight. The lower limit of particle diameter is not especially limited, however, for example, equal to or larger than 1 nm. It should be noted that, in general, there may be the case where those of equal to or larger than 1 mm are called particles, and those of below 1 mm are called powder substances, however, in the present invention, they are called generally powder particle substances (the water-absorbing resin or raw materials thereof), and hereafter referred to as "a powder substance". In addition, in the present description, "the powder substance" and "powder" are treated as synonyms.

Firstly, explanation will be given briefly on the production step of the particulate water-absorbing agent (water-absorbing resin powder substance) relevant to the present invention, and next explanation will be given on the transportation method of the present invention.

FIG. 1 is a schematic configuration view showing a production facility 2 to be used to produce the water-absorbing resin (the particulate water-absorbing agent). In this production facility 2, apparatuses for performing each step are connected by a transportation part 6. A polymerization apparatus 8, a drying apparatus 10, a pulverization apparatus 12, a classification apparatus 14, a mixing apparatus 16, a heating apparatus 18, a cooling apparatus 20, a granule sizing apparatus 22, a filling apparatus 24, a fine powder capturing apparatus 26, and a granulation apparatus 28 are installed in this production facility 2. The water-absorbing resin powder substance obtained in a certain step is transported to the next step by the transportation part 6.

The polymerization step is performed using the polymerization apparatus 8. The drying step is performed using the drying apparatus 10. The pulverization step is performed using the pulverization apparatus 12. The classification step is performed using the classification apparatus 14. The surface cross-linking step is performed using the mixing apparatus 16 and the heating apparatus 18. The cooling step is performed using the cooling apparatus 20. The granule sizing step is performed using the granule sizing apparatus 22. The packaging step is performed using the filling apparatus 24. The fine powders are collected using the fine powder capturing apparatus 26. The granulation step is performed using the granulation apparatus 28. The fine powders collected, or granulated particles granulated in the granulation step are recycled by a fine powder recycling step.

[The Polymerization Step]

The polymerization step is the step for polymerizing a monomer, which can become the water-absorbing resin by polymerization, to generate a polymer gel (a water-containing gel-like polymer). A polymerization method of the water-absorbing resin relevant to the present invention is not especially limited, and for example, bulk polymerization, precipitation polymerization, aqueous solution polymerization, reversed phase suspension polymerization, spraying polymerization, liquid droplet polymerization, or the like is included. In view of performance and easiness of polymerization control, aqueous solution polymerization, where the monomer is used as an aqueous solution, or reversed phase suspension polymerization is preferable.

In the present invention, aqueous solution polymerization, in particular, continuous aqueous solution polymerization is preferable, which is significant in solving a problem of carrying property, owing to shape of the resultant polymer gel. In continuous aqueous solution polymerization, in view of more exerting effect of the present invention, continuous belt polymerization or continuous kneader polymerization may be used suitably. As preferable continuous polymerization, continuous kneader polymerization (for example, U.S. Pat. No. 6,987,151 specification and U.S. Pat. No. 6,710,141 specification) and continuous belt polymerization (for example, U.S. Pat. No. 4,893,999, U.S. Pat. No. 6,241,928, and US-A-2005-215734) are included. In such continuous polymerization, the water-absorbing resin (in particular, an irregular pulverized shaped water-absorbing resin) can be produced in high productivity, however, it tends to provide deflection of or decrease in property accompanying with scale-up, but the present invention is capable of solving also such a problem.

(A Monomer)

The monomer is not especially limited, however, for example, a water-soluble unsaturated monomer shown below is included: for example, an anionic unsaturated monomer such as (meth)acrylic acid, (maleic anhydride) or maleic acid, itaconic acid, cynamiic acid, vinyl sulfonic acid, allyltoluene sulfonic acid, vinyltoluene sulfonic acid, styrene sulfonic acid, 2-(meth)acrylamido-2-methylpropane sulfonic acid, 2-(meth)acryloylethane sulfonic acid, 2-(meth)acryloylpropane sulfonic acid, 2-hydrokyethyl (meth)acryloyl phosphate, and a salt thereof; a mercapto group-containing unsaturated monomer; a phenolic hydroxy group-containing unsaturated monomer; an amide group-containing unsaturated monomer such as (meth) acrylamide, N-ethyl(meth)acrylamide, N,N-dimethyl (meth)acrylamide; an amino group-containing unsaturated monomer such as N,N-dimethylaminoethyl (meth)acrylate, N,N-dimethylaminopropyl (meth)acrylate, N,N-dimethylaminopropyl (meth) acrylamide. These monomers may be used alone or two or more kinds may be used in combination as appropriate. These monomers may contain a polymerization inhibitor or an iron component in an amount of equal to or less than 5 ppm (still more preferably equal to or less than 1 ppm), and preferable use amount is, for example, methoxy phenols in equal to or less than 160 ppm by weight, which is use amount exemplified in U.S. Pat. No. 7,049,366 specification.

Among them, in view of performance and cost of the resulting water-absorbing resin, it is preferable to be a polyacrylic acid (salt)-based water-absorbing resin using, as a principal component, an anionic unsaturated monomer, in particular, an unsaturated monomer containing a carboxyl group, and still more acrylic acid and/or a salt thereof (for example, a salt of sodium, lithium, potassium, ammonium, amines or the like, and among these the sodium salt is preferable in view of cost). Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole (the upper limit is 100% by mole), relative to total monomer components (excluding an internal cross-linking agent to be described later). It should be noted that, when the monomer is an acid group-containing monomer such as a carboxyl group, neutralization rate thereof is not especially limited, and the polymer gel may be neutralized after polymerization, as needed. In applications where there may be contact to a human body, such as hygiene goods, neutralization after polymerization is not necessary. This neutralization rate is preferably equal to or more than 40% by mole and equal to or less than 90% by mole, and more preferably equal to or more than 50% by mole and equal to or less than 80% by mole.

When the above-described monomer is used as an aqueous solution in the polymerization step, concentration of the monomer in said aqueous solution (hereafter may also be referred to as "a monomer solution") is not especially limited, however, within a range of 10 to 70% by weight is preferable, and within a range of 20 to 60% by weight, and still more 35 to 60% by weight is further preferable. In addition, when the aqueous solution polymerization or reversed phase suspension polymerization is performed, a solvent other than water may be used in combination, as needed. It should be noted that, kind of the solvent to be used in combination is not especially limited.

(A Polymerization Initiator)

In the polymerization step, for example, a radical polymerization initiator may be used. This radical polymerization initiator is not especially limited, and one or more kinds may be selected and used from those utilized in polymerization of the usual water-absorbing resin, depending on kind of the monomer to be polymerized, polymerization conditions and the like. For example, a thermal decomposition-type initiator (for example, a persulfate such as a sodium persulfate, a potassium persulfate, an ammoniumpersulfate; a peroxide such as a hydrogen peroxide, a t-butylperoxide, a methyl ethyl ketone peroxide; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazoline-2-yl)propane]dihydrochloride; and the like), or a photodecomposition-type initiator (for example, a benzoin derivative, a benzyl derivative, an acetophenone derivative, a benzophenone derivative, an azo compound or the like); and the like may be included. Among these, in view of cost and reduction capability of residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, however, for example, (hydrogen) sulfurous acid (salt) such as sodium sulfite, sodium hydrogen sulfite, L-ascorbic acid (salt), a reductive metal (salt) such as ferrous salt or the like; amines or the like is included.

Use amount of the radical polymerization initiator to be used in the above-described polymerization step is not especially limited, however, in view of a residual monomer or water-soluble amount, usually 0.001 to 2% by weight is preferable, 0.01 to 0.5% by weight is more preferable, and 0.01 to 0.05% by weight is particularly preferable relative to use amount of the monomer. The use amount of the radical polymerization initiator of below 0.001% by weight, relative to use amount of said monomer, increases the unreacted monomer, and increases amount of the residual monomers in the resultant water-absorbing resin, and is thus not preferable. On the other hand, said use amount of over 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays and the like.

(An Internal Cross-Linking Agent)

In the polymerization step, the internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis (meth) acrylamide, (poly)ethylene glycol di(meth)acrylate, (poly)propylene glycol di(meth)acrylate, trimethylolpropane tri(meth)acrylate, glycerin tri (meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phophate, triallyl amine, polyallyoxy alkane, (poly)ethylene glycol diglycidyl ether, glecerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl (meth)acrylate or the like is include. Among these, in consideration of reactivity, one or more kinds may be used. In particular, as the internal cross-linking agent, a compound having two or more polymerizable unsaturated groups is preferable. Use amount of the internal cross-linking agent may be determined as appropriate by desired property of the water-absorbing resin, however, usually use amount of the internal cross-linking agent is preferably in a range of 0.001 to 5% by mole, still more 0.005 to 2% by mole and particularly 0.001 to 0.5% by mole relative to the monomer. Too low use amount of the internal cross-linking agent tends to decrease strength of the polymer gel and increase soluble content, on the contrary, too excessively high use amount tends to decrease property such as absorbency. It should be noted that, the internal cross-linking agent may be added to a reaction system once as a whole, or may be added dividedly.

[The Drying Step]

The drying step is the step for drying the polymer gel (water-containing gel-like polymer) obtained in the above-described polymerization step. The polymer gel obtained in the polymerization step using aqueous solution polymerization is preferably supplied to the drying step, usually in a particulate state of about 0.1 to 5 mm, still more preferably 0.5 to 3 mm, by crushing treatment during or after polymerization. Because surface area of the gel increases by making particulate gel, the above-described drying step can proceed smoothly. The crushing means is not especially limited, however, for example, various cutting means such as a meat chopper, a roller-type cutter, a guillotine cutter, a slicer, a roll cutter, a shredder, scissors, may be used alone or in combination as appropriate. A drying method in said drying step is not especially limited, however, as the drying apparatus 10, a method for using a usual dryer or a heating furnace may be adopted widely. Specifically, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, referred to as a hot air dryer) is preferable. As this hot air dryer, a drying apparatus such as a through-flow band-type, a through-flow circuit-type, a through-flow vertical-type, a parallel flow band-type, a through-flow tunnel-type, a through-flow groove-type stirring-type, a fluidizedbed-type, an air flow-type, a spray-type is included. In view of easiness of property control of the particulate water-absorbing agent, the band-type is preferable. As drying temperature, setting at relatively high temperature is preferable, specifically preferably 100 to 250° C., more preferably 120 to 220° C., and still preferably 150 to 200° C. Drying time is not especially limited, however, it may be set at the time so as to attain desirable solid content rate of the resultant dried substance. It is preferable that solid content rate of the dried substance obtained in the drying step (specified as reduced amount by drying, obtained by drying at 180° C. for 3 hours) is equal to or higher than 90% by weight, in view of easiness of pulverization. In general, in view of production efficiency, it is preferable that said drying time is usually within two hours, although it depends on particle diameter of the polymer gel, drying temperature, air volume or the like.

[The Pulverization Step]

The pulverization step is the step for pulverizing the particulate water-absorbing resin, as a dried substance of the polymer gel obtained in the drying step. This pulverization is usually performed for the dried substance, however, it may be performed for the polymer gel obtained in the polymerization step before drying. By this pulverization, the particulate water-absorbing resin, as a pulverized substance, can be obtained.

Pulverization is preferably performed so that the particulate water-absorbing resin with desired particle diameter (preferably, a weight average particle diameter of 200 to 800 µm) can be obtained as many as possible. A method for pulverization is not especially limited, and a conventionally known method can be adopted. As the pulverization apparatus 12 to be used in this pulverization step, a three-stage roll mill is exemplified. Because of generation of the fine powders by this pulverization, the fine powders are included in the particulate water-absorbing resin obtained in the pulverization step. It should be noted that, when particle diameter of the particulate water-absorbing resin obtained in the polymerization step or in the drying step is controlled in size and sufficiently small, it is not necessary to perform this pulverization step. The water-absorbing resin or water-absorbing agent obtained by the pulverization step becomes irregular pulverized shaped particles, and such a shape is preferable due to providing large specific surface area, and easy fixing to pulp as well. That is, it is preferable that shape of the water-absorbing resin or the water-absorbing agent is irregular pulverized shaped particles. In addition, irregular pulverized shaped particles was difficult in transportation caused by shape thereof, as well as often generated property decrease accompanying with transportation, however, because of enabling to solve such a problem, in the present invention, such a shape is preferable.

[The Classification Step]

The classification step is the step for sieving the particulate water-absorbing resin. In this classification step, pulverized substances obtained in the above-described pulverization step are sieved. In this classification step, for example, the classification apparatus 14 having a metal mesh is used. In said classification step, by selecting particles having desired particle diameter (a weight average particle diameter (D50), specified by sieve classification) of 200 to 800 µm is preferable, and 300 to 600 µm is more preferable, using this classification apparatus 14, the objective particulate water-absorbing resin can be obtained. A classification method is not especially limited and a conventionally known method can be adopted. It should be noted that, when particle diameter of the particulate water-absorbing resin obtained in the polymerization step or in the drying step is controlled in size and sufficiently small, it is not necessary to perform this classification step. Among these, in particular, sieve classification may be applied suitably and number of sieves is determined as appropriate, however, usually it is about 2 to 5 stages.

[The Surface Cross-Linking Step]

The surface cross-linking step is a step for cross-linking the neighborhood of the surface of the particulate water-absorbing resin obtained in the above-described classification step, using a surface cross-linking agent to obtain the particulate water-absorbing agent. The water-absorbing resin is a water swelling cross-linked polymer, and has a cross-linked structure inside (the particles), however, it is preferable that the water-absorbing resin (the particles) is further surface cross-linked, and cross-link density of the surface thereof or the neighborhood of the surface is increased as compared with that of the inside. It should be noted that, "the neighborhood of the surface" indicates a part of the surface layer, and a part with a thickness of equal to or less than several tens µm or equal to or less than 1/10 of total thickness, however, this thickness is determined as appropriate depending on objectives. In such surface cross-linking of the particulate water-absorbing resin, (1) the surface thereof may be cross-linked with an organic surface cross-linking agent and/or a water-soluble inorganic surface cross-linking agent, exemplified as a surface cross-linking agent to be described later, (2) a cross-linkable monomer may be cross-linking polymerized at the surface thereof (for example, as disclosed in U.S. Pat. No. 7,201,941 specification), or 3) the surface thereof may be radical cross-linked with a persulfate salt or the like (for example, as disclosed in U.S. Pat. No. 4,783,510 specification). In addition, it is preferable that the cross-linking reaction is promoted by heating or radiation rays (preferably UV rays as disclosed in EP No. 1824910 specification). By surface cross-linking of the neighborhood of the surface of the water-absorbing resin contained in the water-absorbing agent, AAP, in other word, absorbing capability against pressure can be increased.

In further detailed description, "surface cross-linking" in the present application means that a region of the surface or the neighborhood of the surface of the particulate water-absorbing resin was surface cross-linked by chemical or physical modification. For example, in the case of partially neutralized cross-linked polyacrylic acid, as an example, chemical modification means a state that the surface cross-linking was performed with the organic surface cross-linking agent having two or more functional groups being able to react with a functional group, in particular, a carboxyl group, present at the neighborhood of the surface of the particles. As the organic surface cross-linking agent having two or more functional groups being able to react with a functional group, for example, a polyvalent alcohol, a polyvalent glycidyl compound, a polyvalent amine or the like is included. Other than this, surface cross-linking in the present application includes surface cross-linking in a form of an ionic bonded state of a surface carboxyl group by a polyvalent metal, such as, for example, trivalent aluminum. The bonding form in the surface cross-linking is not especially limited.

Explanation will be given below on a method for performing surface cross-linking, using a surface cross-linking agent as a preferable cross-linking method. As the surface cross-linking agent to be used in the surface cross-linking step, a conventionally known surface cross-linking agent may be used suitably. For example, there is included a polyhydric alcohol such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol or the like; an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol or the like; a polyvalent amine compound such as ethylenediamine, diethylenetriamine, triethylenetetramine, tetraethylenepentamine, pentaethylenehexamine, polyethyleneimine or the like or an inorganic salt or an organic salt (an aziridinium salt or the like) thereof; a polyvalent isocyanate compound such as 2,4-tolylene diisocyanate, hexamethylene diisocyanate or the like; a polyvalent oxazoline compound such as 1,2-ethylene-bis-oxazoline or the like; an alkylene carbonate compound such as 1,3-dioxolane-2-one, 4-methyl-1,3-dioxolane-2-one, 4,5-dimethyl-1,3-dioxolane-2-one, 4,4-di-methyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxopane-2-one or the like; a halo-epoxy compound such as epichlorohydrin, epibromohydrin, α-methylepichlorohydrin or the like; a polyvalent metal compound such as a hydroxide or chloride of zinc, calcium, magnesium, aluminum, iron, zirconium or the like; an oxazolidinone compound such as 2-oxazolidinone (exemplified in U.S. Pat. No. 6,559,239 specification); an oxetane compound; a cyclic urea compound; or the like. Among these surface cross-linking agents, in view of property, at least one kind of compound selected from a group consisting of a polyhydric alcohol compound, an epoxy compound, a polyvalent amine compound and a salt thereof, and an alkylene carbonate compound, and an oxazolidinone compound are suitable. Still more, one or more kinds of a cross-linking agent having dehydration esterification reactivity, selected from a polyhydric alcohol compound, an alkylene carbonate compound, and an oxazolidinone compound are preferable, and in particular, a polyhydric alcohol compound is suitable. These surface cross-linking agents may be used alone or, in consideration of reactivity, two or more kinds may be used by mixing. It should be noted that, the surface cross-linking step may be performed two or more times in consideration of effect thereof, and in that case, as the surface cross-linking agent to be used in including and subsequent to the second time, the same one as that used in the first time may be used, or a surface cross-linking agent different from that used in the first time may be used. It should be noted that, a dehydration esterification reactive cross-linking agent provides the powder substance with low moisture content, accompanying with dehydration esterification, and tends to generate a problem of property decrease caused by damage during transportation, however, such a problem is solved in the present invention.

The water-absorbing resin powder substance relevant to the present invention is preferably surface cross-linked, and it is preferable to be surface cross-linked with the polyhydric alcohol. Because the present invention is capable of suppressing terminal linear velocity Vy, peeling caused by mutual friction of surface cross-linked layers is suppressed. Therefore, property enhancement effect caused by surface cross-linking with the polyhydric alcohol is difficult to be impaired. It should be noted that, as the polyhydric alcohol, one kind or two or more kinds of the polyhydric alcohol of preferably C2 to C10, more preferably C3 to C8, and particularly preferably C3 to C6 is used.

In the surface cross-linking step, use amount of the above-described surface cross-linking agent depends on the surface cross-linking agent selected or a combination of the surface cross-linking agents, however, use amount from 0.001 part by weight to 10 parts by weight is preferable, and from 0.01 part by weight to 5 parts by weight is more preferable, relative to 100 parts by weight of solid content of the water-absorbing resin. By using the surface cross-linking agent in this range, cross-link density of the neighborhood of the surface of the water-absorbing agent can be made higher than that of the inside. The case where the use amount of the surface cross-linking agent exceeds 10 parts by weight is not only uneconomical but also makes excessive supply of the cross-linking agent for forming an optimal cross-link structure to the water-absorbing resin, and is thus not preferable. The case where the use amount of the surface cross-linking agent is below 0.001 part by weight does not provide sufficient improvement effect in enhancing performance of absorbency against pressure or the like of the particulate water-absorbing agent, and is thus not preferable.

In the surface cross-linking step, in addition to the surface cross-linking agent, an organic acid (lactic acid, citric acid, p-toluenesulfonic acid) or a salt thereof, an acid substance of an inorganic acid (phosphoric acid, sulfuric acid, sulfurous acid) or a salt thereof, a basic substance such as sodium hydroxide or sodium carbonate or the like, a polyvalent metal salt such as aluminum sulfate or the like to be described later, may be used in combination, in over 0% by weight and equal to or lower than 10% by weight, further preferably over 0% by weight and equal to or lower than 5% by weight, and particularly preferably over 0% by weight and equal to or lower s than 1% by weight, relative to the water-absorbing resin.

In the surface cross-linking step, it is preferable to use water as a solvent in mixing the particulate water-absorbing resin and the surface cross-linking agent. Use amount of water depends on kind of the water-absorbing resin, particle diameter and water content of the particulate water-absorbing resin or the like, however, use amount over 0 part by mass and equal to or lower than 20 parts by mass is preferable, and use amount within a range of 0.5 to 10 parts by mass is more preferable, relative to 100 parts by mass of solid content of the particulate water-absorbing resin. In mixing the particulate water-absorbing resin and the surface cross-linking agent, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, t-butyl alcohol; ketones such as acetone; ethers such as dioxane, tetrahydrofuran; amides such as N,N-dimethylformamide; sulfoxides such as dimethylsulfoxide; or the like is included. Use amount of the hydrophilic organic solvent depends on kind of the water-absorbing resin, particle diameter and water content of the particulate water-absorbing resin or the like, however, use amount of 0 part by mass to equal to or lower than 20 parts by mass is preferable, and use amount within a range of 0 part by mass to 10 parts by mass is more preferable, relative to 100 parts by mass of solid content of the particulate water-absorbing resin.

In performing surface cross-linking, firstly, a surface cross-linking agent solution is prepared by mixing water and/or a hydrophilic organic solvent and the surface cross-linking agent in advance. Then, it is a preferable mixing method that this solution is sprayed with a sprayer or the like or dropped to the particulate water-absorbing resin, and a method for mixing by spraying is more preferable. Size of a droplet sprayed is preferably within a range of 0.1 to 300 µm, and more preferably within a range of 0.1 to 200 µm, as an average particle diameter.

The particulate water-absorbing resin, the surface cross-linking agent, water and a hydrophilic organic solvent are mixed using the mixing apparatus 16. This mixing apparatus 16 preferably has large mixing force to uniformly and surely mix both. As the mixing apparatus 16, for example, a cylinder-type mixing machine, a double wall cone-type mixing machine, a high speed stirring-type mixing machine, a V-character-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

In the surface cross-linking step, a mixture of the particulate water-absorbing resin and the surface cross-linking agent enables to perform surface cross-linking even at room temperature, however, in view of promotion of the reaction along with removal of water and the solvent added, it is preferable that, after mixing the particulate water-absorbing resin and the surface cross-linking agent, further heat treatment is performed to cross-link the neighborhood of the surface of the particulate water-absorbing resin. That is, to attain a reaction of the cross-linking agent at the neighborhood of the surface of the particulate water-absorbing resin, in consideration of reactivity of the cross-linking agent, simplicity and productivity of a production facility, or the like, it is preferable to perform heat treatment. In said heat treatment, treatment temperature is preferably equal to or higher than 80° C., although it depends on the surface cross-linking agent selected. The treatment temperature of equal to or higher than 80° C. does not take longer time in the heat treatment, and is capable of preventing decrease in productivity, as well as attaining uniform surface cross-linking. In this case, it is capable of preventing decrease in absorption characteristics under pressurization of the particulate water-absorbing agent, as well as remaining of the unreacted surface cross-linking agent. In addition, in view of property, the treatment temperature (temperature of a heating medium or temperature of a material/in particular, temperature of the heating medium) is preferably in a range of 100 to 250° C., more preferably in a range of 150 to 250° C. This temperature range is particularly suitable for the dehydration esterification reactive surface cross-linking agent.

Heating time is preferably in a range of 1 minute to 2 hours. Suitable examples of a combination of heating temperature and heating time are at 180° C. for 0.1 to 1.5 hours and at 200° C. for 0.1 to 1 hour.

It should be noted that, surface cross-linking at high temperature provides the powder substance with low moisture content, and tends to generate a problem of property decrease caused by damage during transportation, however, such a problem is also solved in the present invention. For example, the present invention is suitably applicable to transportation of the water-absorbing resin powder substance with the water content rate of ERT430.2-02 of 0 to 3%, in particular, 0 to 2%, and in particular, 0 to 1%.

As the heating apparatus 18 for performing the heat treatment, a conventional dryer or a heating furnace is used. For example, a dryer or a heating furnace of a conductive heat transfer-type, a radiation heat transfer-type, a hot air heat transfer-type, an inductive heating-type is suitable. Specifically, a dryer or a heating furnace of a belt-type, a groove-type stirring-type, a screw-type, a rotation-type, a disk-type, a kneading-type, a fluid bed-type, an air flow-type, an infrared ray-type, an electron beam-type is included.

In the surface cross-linking step, the heat treatment may be performed in a static state or under stirring. When the heat treatment is performed under stirring, the surface cross-linking may be completed by heating the mixture in the mixing apparatus 16, where the particulate water-absorbing resin and the surface cross-linking agent were mixed, and the surface cross-linking may be completed by heating said mixture, by charging the mixture, for example, into a twin-screw groove-type stirring drying apparatus.

[The Cooling Step]

The cooling step is a step for cooling, as needed, the particulate water-absorbing agent obtained by heating in the surface cross-linking step and by cross-linking the neighborhood of the surface, before charging to the subsequent step (for example, the granule sizing step) aiming at terminating or controlling a cross-linking reaction. The cooling apparatus 20 to be used in this cooling step is not especially limited, however, for example, a twin-screw stirring dryer or a groove-type stirring-type dryer or the like, where cooling water is passed through inside of the inner wall or other heat transfer surfaces, can be used, and temperature of this cooling water is set at below heating temperature, that is, equal to or higher than 25° C. and below 80° C., and preferably 30° C. to 60° C.

It should be noted that, in the surface cross-linking step, there may be the case where surface cross-linking of the particulate water-absorbing resin is performed at room temperature. In this case, because the particulate water-absorbing agent obtained by the surface cross-linking is not heated, this cooling step may not be performed. Therefore, this cooling step is other step which may be contained further in this production method, as needed.

[The Addition Step of Additives]

In the present invention, the addition step for adding additives other than the surface cross-linking agent may be installed further. This addition step is preferably installed including and subsequent to the polymerization step, and more preferably installed including and subsequent to the drying step. The additives may be added at the same time as the surface cross-linking or separately, for example, in the cooling step or other steps. As the additives, for example, the following (A) a deodorant component (preferably, a plant component), (B) a polyvalent metal salt, (C) an inorganic particle (including (D) a composite water-containing oxide), (E) a liquid permeation improver, (F) other additives and the like may be added. By this addition, various functions can be furnished to the particulate water-absorbing agent. Further, the following (G) chelating agent may be added to this particulate water-absorbing agent.

Use amount of the (A) to (E) and (F) differs depending on objectives and functions to be furnished, however, it is usually, as addition amount of one kind thereof, in a range of 0 to 10 parts by mass, preferably 0.001 to 5 parts by mass, and further preferably 0.002 to 3 parts by mass, relative to 100 parts by mass of the water-absorbing resin. Usually, when this addition amount is lower than 0.001 part by mass, sufficient effect and functions to be furnished by the additives cannot be obtained, and when this addition amount is over 10 parts by mass, effect comparable to the addition amount cannot be obtained or water absorbing performance decreases.

(A) The Deodorant Component

The particulate water-absorbing agent can be formulated with the deodorant component, preferably the plant component, in the above amount, to exert deodorant property. The plant component is not especially limited, and exemplified in US-A-2004/048955 specification, WO 2002/42379 pamphlet or the like.

(B) The Polyvalent Metal Salt

It is preferable that the particulate water-absorbing agent obtained by the production method is formulated with the polyvalent metal salt or a hydroxide of the polyvalent metal, preferably the polyvalent metal salt, more preferably a water-soluble polyvalent metal salt, still more preferably a water-soluble polyvalent metal salt of a trivalent or tetravalent metal, particularly preferably a water-soluble ammonium salt, at the surface of the water-absorbing resin, for aiming at enhancing liquid permeation and powder hygroscopic fluidity. Preferable amount of this polyvalent metal salt is as described above. It has been discovered that formulation of the polyvalent metal salt decrease transportation efficiency and property during transportation in a large degree, therefore the method of the present invention can be applied suitably. As this polyvalent metal salt, a polyvalent metal salt of an organic acid and a polyvalent metal salt of an inorganic acid described in US-A-2002/0128618 specification, US-A-2006/0204755 specification and the like are exemplified. It should be noted that, the water-soluble polyvalent metal salt is a polyvalent metal salt which dissolves in water at normal temperature in equal to or more than 0.1 g/100 g (preferably equal to or more than 1 g/100 g, and particularly preferably equal to or more than 10 g/100 g), and it is mixed as the powder substance or a solution, and the solution may be a dispersion solution with over saturation concentration. As a preferable organic polyvalent metal salt, aluminum lactate, calcium lactate or the like is exemplified.

In addition, as the preferable inorganic polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt thereof having crystal water is preferable. A particularly preferable one is an aluminum compound, and among these, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable: powders of water-containing crystal such as aluminum sulfate-octadeca hydrate salt, aluminum sulfate-tetradeca to octadeca hydrate salt may be used most suitably. They may be used as only one kind, or two or more kinds may be used in combination. In view of handling property and mixing property with the water-absorbing resin powder substance, the polyvalent metal salt is used preferably in a solution state, and is used particularly preferably in an aqueous solution state. Other than these, the polyvalent metal salt of an organic acid and a mixing method thereof are exemplified, for example, in WO 2004/069936 pamphlet. In addition, concentration of the solution may be over the saturation concentration, however, preferably, it is added in a concentration of 10 to 100%, and still more 30 to 100% of the saturation concentration in the normal temperature or heated solution.

Among the polyvalent metal salts, as the water-soluble polyvalent metal salt, aluminum sulfate and various alums are included. According to the transportation method of the present invention, it is possible to satisfy both problems, which are in contradictory relation; suppression of fracture of the water-absorbing resin powder substance caused by low transportation speed, and prevention of decrease in transportation efficiency caused by blocking or the like in a transportation pipeline. Therefore, the transportation method of the present invention is effective in the water-absorbing resin powder substance containing the water-soluble polyvalent metal salt. The water-absorbing resin powder substance containing the polyvalent metal salt has the surface difficult to slip, and large friction coefficient at the surface. In particular, in the case of the water-soluble polyvalent metal salt such as aluminum sulfate or the like, increase in this friction coefficient is significant. Caused by this high friction coefficient, blocking phenomenon tends to generate. When air pressure is increased to suppress this blocking phenomenon, moving velocity (an initial linear velocity Vx and a terminal linear velocity Vy) of the water-absorbing resin powder substance in the transportation pipeline increases, which increases damage of the water-absorbing resin powder substance. The present invention is capable of decreasing the initial linear velocity Vx and the terminal linear velocity Vy, as well as suppressing the blocking phenomenon, therefore it is effective in the water-absorbing resin powder substance containing the water-soluble polyvalent metal salt. In addition, the present invention is capable of suppressing the initial linear velocity Vx and the terminal linear velocity Vy, therefore peeling of the polyvalent metal salt from the surface of the powder substance caused by mutual friction can be suppressed. Therefore, property enhancement effect by the polyvalent metal salt is difficult to be impaired.

(C) The Inorganic Particle

The particulate water-absorbing agent may be formulated with the inorganic particle, in particular, a water-insoluble inorganic particle (water-insoluble fine particles) at the surface of the water-absorbing resin, in order to enhance liquid permeation or prevent blocking in moisture absorption. As the inorganic particle, specifically, for example, a metal oxide such as silicon dioxide or titanium oxide; silicic acid (salt)

such as natural zeolite or synthetic zeolite; kaolin, talc, clay, bentonite or the like is included. Among these, silicon dioxide and silicic acid (salt) are more preferable, and silicon dioxide and silicic acid (salt), having an average particle diameter of 0.001 to 200 μm, measured by the Coulter counter method, is further preferable.

To make exert superior hygroscopic fluidity (fluidity of powders after the water-absorbing resin or the water-absorbing agent absorbed moisture), and deodorant function of the particulate water-absorbing agent, a composite water-containing oxide containing zinc and silicon, or a composite water-containing oxide containing zinc and aluminum may be formulated.

When inorganic particles are formulated, a problem of decrease in transportation efficiency or decrease in property during transportation in a large degree has been discovered, however, in the present invention, the initial linear velocity Vx (linear velocity of the water-absorbing resin powder substance at the start point of the transportation pipeline) can be suppressed, therefore peeling of the inorganic particles from the surface of the powder substance caused by mutual friction can be suppressed, and as a result, property enhancement effect by the inorganic particles is difficult to be impaired. Therefore, the method of the present invention is applicable suitably.

(D) A Polyamine Compound (a Polyvalent Amine Compound)

A polyamine may be added aiming at enhancing liquid permeation and enhancing shape retention property of the particulate water-absorbing agent. For example, a water-soluble polyamine polymer, in more specifically, polyethyleneimine, polyvinylamine, polyallylamine, having a weight average molecular weight of 200 to 1000000, or the like may be exemplified. In the particulate water-absorbing agent, they are used for surface covering or cross-linking of the water-absorbing resin. A polyamine polymer applicable to the water-absorbing resin is exemplified, for example, in US-A-2003/069359 specification, US-A-2005/0245684 specification, WO 2006/082197 pamphlet, WO 2006/074816 pamphlet, WO 2006/082189 pamphlet, WO 2008/025652 pamphlet, WO 2008/025656 pamphlet, WO 2008/025655A1 pamphlet or the like.

(E) a Liquid Permeation Improver

The liquid permeation improver means the additive for enhancing saline flow conductivity (SFC) of the water-absorbing resin or the water-absorbing agent having a saline flow conductivity (SFC) of equal to or higher than 6 ($\times 10^{-7} \cdot cm^3 \cdot s \cdot g^{-1}$) to be described later, by equal to or higher than 10 ($\times 10^{-7} \cdot cm^3 \cdot s \cdot g^{-1}$). Preferably, it is a compound for enhancing liquid permeation by retaining or expanding a space between particles, as an ion-like spacer (cation), or a stereoscopic spacer (fine particles). Therefore, even the additives exemplified in the (A) to (D) may be the case corresponding to this liquid permeation improver. In the transportation method in the present invention, it is preferable that this liquid permeation improver is the (B) to (D).

Among these, the water-soluble polyvalent metal salt such as aluminum sulfate, potassium alum, exemplified by the (B) and is capable of being an ion-like spacer, is preferable in view of enhancing saline flow conductivity (SFC).

The existence form in the particulate water absorbing agent of liquid permeation improver may be particulate or one coated (usually coated by the solution) with molecular level over the whole, or the combination thereof. However, the liquid permeation improver is preferably used in an aqueous solution form, in view of easy addition more uniformly to the whole surface of the water-absorbing resin, and no segregation or the like of the liquid permeation improver. The liquid permeation improver is used preferably in a ratio of 0.001 to 10% by weight, and more preferably in a ratio of 0.01 to 5% by weight, relative to the water-absorbing resin.

(F) The Surfactant

It is preferable that the particulate water-absorbing agent contains the surfactant. Presence of the surfactant is capable of enhancing powder substance characteristics (fluidity of the powder substance or fluidity in humidity absorption or the like). In particular, it is preferable that the surfactant is included at the surface of the water-absorbing resin.

As the surfactant, an anionic surfactant such as a fatty acid salt or a higher alcohol sulfate or the like; a nonionic surfactant such as a sorbitan fatty acid ester such as sorbitan monolaurate, sorbitan monopalmitate, sorbitan monostearate, sorbitan tristearate or the like; a cationic surfactant such as an alkyl amine salt such as coconut amine acetate, stearyl amine acetate or the like; or an ampholytic surfactant is exemplified. Other than these, a surfactant described in U.S. Pat. No. 6,107,358 is applicable to the present invention. It should be noted that, the addition method for the surfactant is not especially limited, and preferably it is added at the granulation step exemplified in U.S. Pat. No. 6,228,930, U.S. Pat. No. 6,458,921, U.S. Pat. No. 7,153,910 and U.S. Pat. No. 7,378,453. In addition, the addition timing of the surfactant is also not especially limited, and any timing may be allowed, for example: (a) the surfactant is added in an aqueous solution of acrylic acid in the polymerization step, and polymerization is performed in the presence of the surfactant; (b) the surfactant is added to the water-containing gel after polymerization in the polymerization step; (c) the surfactant is added during or after drying in the drying step; (d) the surfactant is added during or after pulverization or classification of the dried substance in the pulverization or classification step; (e) the surfactant is added during or after surface cross-linking in the surface cross-linking step; (f) the surfactant is added to the water-absorbing resin as a final product; or the like. It should be noted that, the surfactant may be added before and after the surface cross-linking step so as to be contained at the surface.

Use amount of the surfactant is preferably 0.0005 to 0.012 parts by weight, more preferably 0.0005 to 0.001 parts by weight, still more preferably 0.001 to 0.0045 parts by weight, and particularly preferably 0.0015 to 0.004 parts by weight relative to 100 parts by weight of the water-absorbing resin. The amount below 0.0005 parts by weight may provide the case of insufficient enhancement of fluidity and bulk density. On the other hand, the amount over 0.012 parts by weight has a problem of decrease in surface tension of an absorption fluid, as well as may provide the case of not able to exert effect comparable to the addition amount, and is thus uneconomical.

The surfactant to be used in the present invention is not limited to the above surfactants. Among the above surfactants, in view of safety, nonionic surfactants are preferable, and among them, a sorbitan fatty acid ester and a polyoxyethylene sorbitan fatty acid ester are particularly preferable. In addition, HLB (hydrophilicity-hydrophobicity property balance) of the surfactant to be used in the present invention is not especially limited, however, it is in a range of preferably 8 to 18, more preferably 9 to 17, and still more preferably 10 to 17. When HLB is within this range, fluidity and bulk density of the particulate water-absorbing agent can be enhanced more suitably.

(G) A Chelating Agent

The water-absorbing resin powder substance to be used in the present invention may contain the chelating agent for coloring prevention, urine resistance enhancement or the like.

A step for mixing the chelating agent is not especially limited, however, it is preferable that the chelating agent is mixed into the monomer or the monomer solution. The chelating agent is not especially limited, and for example, a chelating agent exemplified in EP-A-1426157, WO 2007/28751 and WO 2008/90961 can be used. From an effect aspect, preferable one is a water-soluble organic chelating agent whose molecular weight is 100 to 1000. As a specifically preferable chelating agent, for example, an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, and a salt thereof; and an amino polyvalent phosphorous compound such as ethylenediamine-N,N'-di(methylenephosphinic acid), ethylenediamine tetra(methylenephosphinic acid), polymethylenediamine tetra(methylenephosphonic acid), diethylenetriamine penta (methylenephosphonic acid), and 1-hydroxyethylidene diphosphonic acid, and a salt thereof; is included. It is desirable that use amount of the chelating agent is equal to or more than 0.001 part by mass, preferably equal to or more than 0.05 parts by mass, and still more preferably equal to or more than 0.1 part by mass, relative to 100 parts by mass of the water-absorbing resin contained in the water-absorbing resin powder substance, as well as equal to or less than 1 part by mass, preferably equal to or less than 0.5 parts by mass, and still more preferably equal to or less than 0.2 parts by mass, relative to 100 parts by mass of the water-absorbing resin.

The (B) and (C) can be used suitably as a surface treatment agent. Surface treatment in the present application means that a region of the surface or the neighborhood of the surface of the water-absorbing resin has been surface cross-linked by chemical or physical modification. Here, chemical modification means a state of modification accompanying with any of a chemical bonding (covalent bonding or ionic bonding), and physical modification means physical covering or adhesion without accompanying with the chemical bonding.

(H) A Lubricant (a Slip Property Enhancement Agent)

It is preferable that the particulate water-absorbing agent contains the lubricant. In particular, it is preferable that the lubricant is contained at the surface of the water-absorbing resin. "The lubricant" means a substance being present between two surfaces mutually slipping, and has an action to decrease friction (resistance). The lubricant which can be used in the present invention is not especially limited, as long as it is a solid lubricant at normal temperature (25° C.) and under normal pressure (0.101 MPa). The lubricant is exemplified in U.S. Pat. No. 7,473,739 specification, WO 2008/120742 pamphlet or the like, and the lubricant exemplified therein may be used preferably also in the present invention. For example, a hydrocarbon-based lubricant, a fatty acid-based lubricant (preferably having equal to or more than C12), a fatty acid amide-based lubricant, an ester-based lubricant, an alcohol-based lubricant (glycol or a high alcohol), a metal soap lubricant or the like is included. Among them, in view of having an action as a lubricant as well as also having an action as a stabilizer, it is preferable to use a metal soap lubricant exemplified in U.S. Pat. No. 7,282,262 specification.

Powder substance temperature of the water-absorbing resin in mixing with the lubricant is usually set at equal to or higher than room temperature, however, it is mixed preferably at equal to or higher than 40° C., and more preferably at equal to or higher than 50° C., to obtain stable water absorbing characteristics or flow down speed or bulk density of the particulate water-absorbing agent. The amount is preferably 0.0001 to 0.1% by weight, more preferably 0.01 to 0.05% by weight, and particularly preferably 0.001 to 0.01% by weight, relative to 100% by weight of the water-absorbing resin.

In particular, in the present invention, as the additive to enhance liquid permeation, (B) the polyvalent metal salt is preferable. It is preferable that the polyvalent metal salt is mixed after the addition. As an apparatus for mixing, the mixing apparatus 16, the same as for the surface cross-linking agent may be included.

It should be noted that, the polyvalent metal salt is preferably mixed with the water-absorbing resin particles (the particulate water-absorbing resin) as an aqueous solution. Size of a droplet of the aqueous solution can be adjusted as appropriate. In view of preventing permeation and diffusion of a polyvalent metal ion (for example, an aluminum ion) into the inside of the water-absorbing resin particles, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to saturated concentration. Naturally, it may have the saturated concentration (=100% to the saturated concentration). In addition, from the similar reason, use amount of water is about 0.1 to 30% by weight, and still more about 0.2 to 10% by weight relative to weight of the water-absorbing resin, and drying may be performed after the addition as needed.

[The Granule Sizing Step]

Irrespective of adjustment of the particle diameter in the pulverization step and classification step, there may be the case where an aggregated substance having large particle diameter is included in the particulate water-absorbing agent after the surface cross-linking step or the cooling step. This aggregated substance may be generated principally in mixing the surface cross-linking agent, or in a surface cross-linking reaction. In this granule sizing step, in order to re-adjust the particle size, the crushing treatment and classification treatment of this aggregated substance is performed. Performing order and number of times of this crushing treatment and classification treatment are not especially limited. In this granule sizing step, for example, firstly the classification treatment is performed for the particulate water-absorbing agent. In this classification treatment, a classification apparatus such as a sieve or an air flow classification machine is used to remove the aggregated substance with large particle diameter or the fine powders with small particle diameter. For the aggregated substance obtained by this classification treatment, the crushing treatment is performed to crush and separate particles composing the aggregated substance to an individual particle. In this crushing treatment, for example, a knife cutter-type crushing machine is used. For the crushed substance obtained by this crushing treatment, the classification treatment is performed again to remove the fine powders having small particle diameter, as well as to obtain the particulate water-absorbing agent having desired particle diameter (preferably, a weight average particle diameter of 200 to 800 μm). In view of productivity, it is preferable that this granule sizing step is performed after the cooling step. However, in invention of the present application, when the aggregated substance with large particle diameter is not contained in the particulate water-absorbing agent before charging to this granule sizing step, this granule sizing step may not be performed. This granule sizing step is other step which may be contained further in the transportation method of the present invention, as needed.

[The Packaging Step]

The packaging step is a step where the particulate water-absorbing agent is packaged. When the granule sizing step is performed, in this packaging step, the particulate water-absorbing agent, which was granule-sized in the above-described granule sizing step, is packaged. For example, in this packaging step, the particulate water-absorbing agent transferred to a hopper for storage is filled into a storing bag using the filling apparatus 24. The particulate water-absorbing agent filled in the storing bag is shipped as a product via the predetermined inspection. A granule sizing method is exemplified in U.S. Pat. No. 7,347,330 specification, US-A-2005/0113252 specification or the like.

[A Fine Powder Recycling Step]

The fine powder recycling step is a step for returning the fine powders removed by classification or the like (for example, particles containing particles below 150 μm as a principal component, in particular, in an amount of equal to or more than 70% by weight) to the production step of the water-absorbing resin, in various objects such as reducing the fine powders and the like, and preferably by being recycled to the polymerization step or the drying step, removal and reuse of the fine powders are possible. That is, in one embodiment of the present invention, the water-absorbing resin powder substance contains a fine powder recycled substance of the water-absorbing resin. In such a recycling step, the fine powders may be returned as themselves, or may be recycled after pulverization in a pulverization step to be described later. A recycling method includes: the fine powders are mixed into a polymerization machine, preferably a stirring polymerization machine such as a kneader to make a unified substance; the fine powders or a granulated substance thereof are mixed with polymer gel separately after polymerization; for example, (crushing) mixing with a meat chopper; or mixing in a dryer.

Conventionally, as estimated to be derived from fracture or regeneration of the granulated substance of the fine powders, the water-absorbing resin via such a fine powder recycling step, that is, the water-absorbing resin containing the fine powder recycled product tended to decrease property easily in the transportation step, however, in the present invention, there are no such problems as well, because the fine powders are removed in the fine powder recycling step, and also property enhances, as well as impact is suppressed without accompanying with decrease in transportation efficiency in pneumatic transportation. A preferable fine powder recycling method is exemplified, for example, in U.S. Pat. No. 6,133,193 specification, U.S. Pat. No. 6,228,930 specification, U.S. Pat. No. 5,455,284 specification, U.S. Pat. No. 5,342,89 specification, US-A-2008/0306209 specification, and amount of the fine powders is decreased by adding the fine powders in the production step of the water-absorbing resin such as the polymerization step, the gel pulverization step, the drying step, or the like. In addition, recycling amount of the fine powders is determined as appropriate, for example, in about 1 to 30% by weight, still more 5 to 25% by weight, particularly 8 to 20% by weight of production amount. In addition, the fine powders are recycled to the production step as dry powders as themselves, or by gelling by adding water as needed, or in particular, recycled to a monomer and/or gel (before drying or during polymerization).

[The Granulation Step]

The granulation step is a step for obtaining the granulated particle by adding aqueous liquid to the fine powders. The fine powders may be obtained by the classification step. The fine powders may be those collected with a fine powder capturing apparatus 26 from atmosphere of other step (the pulverization step or the granule sizing step). The fine powder capturing apparatus 26, for example, is provided with a filter which is capable of capturing the fine powders. The granulated particle is composed of a plurality of the fine powders. Weight average particle diameter of the granulated particle is equal to or smaller than 20 mm, preferably 0.3 to 10 mm, and more preferably 0.35 to 5 mm. It should be noted that, the granulation may be performed using only the fine powders (for example, a substance passed 150 μm), or may be performed using the whole particles containing the fine powders (the water absorbing resin powder substance which is a substance passed 850 μm, and contains a substance passed 150 μm in predetermined amount).

The granulated particle obtained by the granulation step may be used as it is as a granulated product, however, it is preferably charged to any of the steps. In view of production efficiency, it is preferable that this granulated particle is charged to the drying step as a fine particle recycling step and dried in the co-presence of the polymer gel. As shown in FIG. 1, in this production facility 2, the transportation part 6 jointed to the fine powder capturing apparatus 26 is jointed to the granulation apparatus 28. This granulation apparatus 28 is jointed to the drying apparatus 10 by the transportation part 6. The fine powders discharged from the fine powder capturing apparatus 26 are charged to the granulation apparatus 28 by being transported using the transportation part 6. The fine powders are also the water-absorbing resin powder substance. The granulated particle formed at this granulation apparatus 28 is also put to the drying apparatus 10 by being transported using the transportation part 6. It can be confirmed for the particulate water-absorbing agent to be the granulated particle from the fact that an individual particle is aggregated by gathering in multiple while retaining shape thereof, or from the fact that it swells as a plurality of discontinuous particles in absorbing a solution, with an optical microscope.

[A Storage Step]

Figure 2:
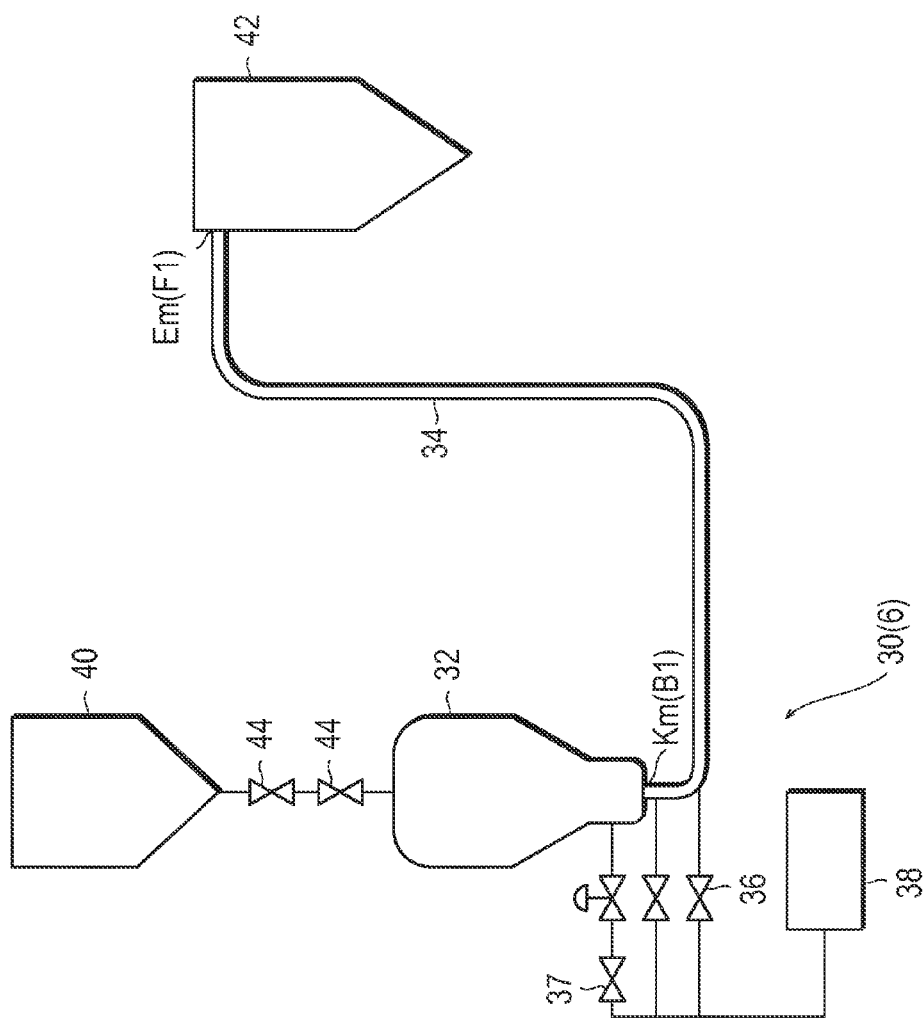
FIG. 2 is a drawing showing a schematic configuration of a transportation apparatus which can be used in one embodiment of the present invention.

It is preferable the transportation method for the water-absorbing resin powder substance of the present invention includes the storage step of the water-absorbing resin powder substance. An apparatus to be used in said storage step is called "a hopper" in the present invention. The hopper is an apparatus for storing and keeping the water-absorbing resin powder substance temporarily or for a long period, and in the present invention, a silo-like (longitudinally longer shape) one is also included, as long as it is specified shape. Specifically, as shown in FIG. 2, an apparatus such as a receiving hopper 40, a pressurized tank hopper 32, a storage hopper 42 or the like is included. It should be noted that, detail of FIG. 2 will be described later.

By using the hopper, feeding becomes possible to an apparatus to be used in each step, in quantitative mass flow, without damaging or fracturing the water-absorbing resin powder substance. In this way, the water-absorbing resin with high function and high property can be produced stably without variation by lot.

FIG. 3 is a schematic view of the hopper which can be used in one embodiment of the present invention. As shape of the hopper, in view of carrying property and transferring property of the powder substance, in particular, the water-absorbing resin powder substance, an inverse truncated pyramid shape or an inverse circular truncated cone shape, as shown in the left drawing of FIG. 3, along with shape where a rectangular column of the same shape is added at the maximum caliber part of the inverse truncated pyramid, or shape where a circular cylinder of the same shape is added at the maximum caliber part of the inverse circular truncated cone, as shown in the right drawing of FIG. 3, are preferably used. In addition, ratio of maximum caliber (diameter) and height of the hopper (maximum caliber of the hopper/height of the hopper, for example, "R1/H" in FIG. 3) is in a range of 1/10 to 10/1, still more 1/3 to 3/1, and particularly 1/2 to 2/1. Here, for the inverse truncated pyramid shape or the inverse circular truncated cone shape, as shown in the left drawing of FIG. 3, "height of the hopper" indicates height of the inverse truncated pyramid part or the inverse circular truncated cone part ("H" in the left drawing of FIG. 3). In addition, for the inverse truncated pyramid shape or the inverse circular truncated cone shape added with the rectangular column or the circular cylinder, as shown in the right drawing of FIG. 3, it indicates total height of height of the inverse truncated pyramid part or the inverse circular truncated cone part, added with height of the rectangular column part or the circular cylinder part ("H" in the right drawing of FIG. 3). In addition, when the hopper is not a cylinder, maximum caliber of the hopper is specified by conversion to a diameter of a circle equivalent to the maximum cross-section thereof. As for shape of the inverse truncated pyramid shape or the inverse circular truncated cone shape, as ratio of the inverse pyramid (or the inverse circular cone) and the truncated part, it is adopted one where height of the truncated part is smaller, or in the case where the hopper cross-section has home base shape, cross-section of the triangle part thereof is adopted principally. That is, a principal component of the water-absorbing resin powder substance, preferably equal to or more than 50% by weight, and still more preferably equal to or more than 80% by weight is stored in a part of pyramid or circular cone of the hopper. In the present invention, it is preferable to use the hopper having specified shape of a cone inclination angle of equal to or larger than 45 degree, and a drawing rate of 0.3 to 0.8. The upper limit of the cone inclination angle is preferably below 90 degree. In the present description, "the cone inclination angle" is, as shown in FIG. 3, inclination angle of a side wall surface to a horizontal surface of the hopper installed. The cone inclination angle of the hopper of the present invention is set at preferably equal to or larger than 50 degree, still more preferably 60 to 90 degree, particularly preferably 65 to 85 degree, and most preferably 68 to 85 degree. It should be noted that, when the side wall surface is not flat, it is specified by average value of angles determined from the whole side wall surfaces thereof.

In addition, in the present description, "the drawing rate" is a value of ratio (R2/R1×100) specified by caliper of the opening part of the upper surface of the hopper (maximum caliber part of the upper part of the hopper (R1)) and the opening part of the bottom surface of the hopper (caliper of the discharging part of the hopper (R2)), expressed in percent. The drawing ratio of the hopper is set at preferably 30 to 80%, more preferably 35 to 80%, still more preferably 40 to 80% and particularly preferably 40 to 70%. It should be noted that, when the caliper is not a circle, for example, an ellipse or a polygon, it is specified with converted to the circle equivalent to the cross-section area thereof. When the hopper within the above range is used, the water-absorbing resin with desired high property can be produced stably.

In addition, a filling rate (average) of the water-absorbing resin powder substance inside the hopper is over 0% by volume and equal to or lower than 90% by volume, preferably 10 to 80% by volume, still more preferably 30 to 80% by volume, and particularly preferably 40 to 80% by volume. In the present description, "the filling rate" is specified by volume ratio (% by volume) of the water-absorbing resin to be filled relative to inner volume of the hopper, and by controlling it within the above range, transfer property of the water-absorbing resin becomes good.

A material of the hopper is not especially limited, however, stainless steel is preferable, and surface roughness or the like of the inner surface thereof is in accordance with the pipeline which a pneumatic transportation apparatus to be described later has.

It is preferable that a residence time (average) of the water-absorbing resin in the hopper is also controlled, and the residence time is preferably equal to or shorter than 24 hours, more preferably equal to or shorter than 12 hours, still more preferably equal to or shorter than 6 hours and particularly preferably equal to or shorter than 2 hours, although it depends on amount of the water-absorbing resin to be filled in the hopper. The case where the residence time is over 24 hours may generate property decrease or blocking, and is thus not preferable. It should be noted that, the lower limit of the residence time (average) of the water-absorbing resin in the hopper is not especially limited, and it is preferable to be as short as possible.

It should be noted that, as an embodiment most exerting effect of the present invention, the method of the present invention is applied to a transportation method in producing the water-absorbing resin in a production amount of, for example, equal to or higher than 100 kg per hour, preferably equal to or higher than 500 kg per hour, and particularly preferably equal to or higher than 1 ton per hour.

Further, it is preferable that the hopper is heated, and temperature of the surface thereof is preferably in a range of 40 to 120° C., still more preferably 50 to 90° C., and particularly preferably 60 to 80° C. In addition, it is preferable that the water-absorbing resin powder substance stored in the hopper is also heated, and temperature thereof is preferably in a range of 40 to 120° C., still more preferably 50 to 90° C., and particularly preferably 60 to 80° C. The case of lower temperature than the above may generate a case of decrease of property value or increase in deflection width of property value, and aggregation of the water-absorbing resin. In addition, the case of higher temperature than the above may generate a case of decrease of property value or increase in deflection width of property value, as well as coloring of the water-absorbing resin.

In addition, a moisture content of the water-absorbing resin powder substance to be stored in said hopper is not especially limited, however, preferably 0.1 to 30% by weight, and more preferably 0.1 to 10% by weight. By setting the water content rate at the above range, in storing (or filling) the water-absorbing resin powder substance in said hopper, damage can be reduced and property decrease can be suppressed.

When the powder substance (the water-absorbing resin powder substance) is handled in each step, the hopper is applied at each step, in discharging the powder substance after storage of the powder substance in at least one or more positions of including and subsequent to the drying step. That is, the hopper may be installed at any time during the drying step; during the pulverization or classification step; during the surface cross-linking step; between the drying step and the pulverization or classification step; between the pulverization or classification step and the surface cross-linking step; during or after the step for filling (the filling step) the water-absorbing resin, obtained as the final product at including and subsequent to the surface cross-linking step, into a container bag or the like; between the surface cross-linking step and the filling step; or the like. In addition, the hopper may be installed at one place, or at two or more places at each of the time. Still more, in the latter case, a plurality of the hoppers may be installed continuously, or other step (or an apparatus) may be installed between the hoppers.

Carrying of the water-absorbing resin powder substance from the previous step to the storing step where said hopper was used, or carrying from the storing step to the next step is preferable performed by pneumatic transportation to be described later. The transportation method relevant to one preferable embodiment of the present invention has a step for storing the water-absorbing resin powder substance after the pneumatic transportation step. According to such an embodiment, there is no property decrease caused by impact, as well as quality of high property can be maintained stably, and is thus preferable.

Outline of the production step of the particulate water-absorbing agent relevant to the present invention is as described above. Explanation will be given next on the transportation (carrying) method relevant to the present invention.

In the present invention, pneumatic transportation is applied to transportation of the water-absorbing resin powder substance generated in each of the steps (the particulate water-absorbing resin and the particulate water-absorbing agent). Pneumatic transportation is performed by the transportation part 6 shown in FIG. 1. Pneumatic transportation is not suitable between the polymerization apparatus 8 and the drying apparatus 10, between the mixing apparatus 16 and the heating apparatus 18, and between the granulation apparatus 28 and the drying apparatus 10, because a substance to be transported is wet (however, it is not intended to exclude application of pneumatic transportation), however, in other transportation part 6, pneumatic transportation can be used suitably because the substance to be transported (the water-absorbing resin powder substance) is in a dry state. In the present invention, pneumatic transportation may be used in at least one place, or at two or more places among the transportation part 6 of FIG. 1. For the transportation part 6, where pneumatic transportation is not adopted, a mechanical transportation, for example, a conveyor or the like can be adopted.

FIG. 2 is a schematic view of a pneumatic transportation apparatus 30 which can be used in one embodiment of the present invention. The pneumatic transportation apparatus 30 has a pressurized tank hopper 32, a transportation pipeline 34, a pipeline for the secondary air (not shown), a valve 37, a valve for the secondary air 36, and a compressor 38. The compressor 38 is connected to the pressurized tank hopper 32 via the valve 37. By the compressor 38, inside of the pressurized tank hopper 32 can be pressurized. In addition, the compressor 38 is connected to the transportation pipeline 34 via the valve 37. The compressor 38 can supply air of the transportation pipeline 34. The secondary air is supplied via the valve 36. The secondary air is supplied to the pipeline for the secondary air via the valve 36. The compressor 38 can supply air (the secondary air) of the pipeline for the secondary air. In FIG. 2, one compressor 38 is drawn, however, the compressor 38 may be present in multiple. It should be noted that, a method for supplying the secondary air is present variously and is not limited to the method of the present embodiment.

In the embodiment of FIG. 2, the pneumatic transportation apparatus 30 transports the water-absorbing resin powder substance from a receiving hopper 40 to the storage hopper 42. For example, it is assumed the case where the pneumatic transportation apparatus 30 connects an apparatus for performing a step X, and an apparatus for performing a step Y. The step X and the step Y are not especially limited. The step Y is the next step of the step X. In this case, in the receiving hopper 40, the water-absorbing resin powder substance generated by the step X is stored. In addition, the water-absorbing resin powder substance transported by the pneumatic transportation apparatus 30 is stored in the storage hopper 42 and supplied to the step Y. That is, in the present embodiment, the hoppers (40, 32) are installed after the step X, and after the water-absorbing resin powder substance is stored in said hopper (the storage step), said water-absorbing resin powder substance is pneumatically transported via the transportation pipeline 34 (the pneumatic transportation step), and the water-absorbing resin powder substance transported is stored in the hopper (42) before the step Y (the storage step). It should be noted that, the storage hopper 42 corresponds to a storing unit in the embodiment of FIG. 5 to be described later. The water-absorbing resin powder substance stored in the receiving hopper 40 falls into the pressurized tank hopper 32 by opening a valve 44. Next, the valve 44 is closed to introduce pressurized air into the pressurized tank hopper 32. By pressure of this air (primary air), the water-absorbing resin powder substance in the pressurized tank hopper 32 is moved inside of the transportation pipeline 34, reaching the storage hopper 42.

In the present invention, pneumatic transportation is possible even by primary air only, however, by using the secondary air still more, more preferable transportation can be performed. In the present description, the secondary air 41 is air supplied to the transportation pipeline 34 via the pipeline for secondary air. On the contrary, air supplied to the transportation pipeline 34 not via the pipeline for the secondary air is also called the primary air in the present application. The primary air includes air flowing in from the pressurized tank hopper 32 to the transportation pipeline 34, or air to be supplied from the compressor 38 to the transportation pipeline 34 directly.

Figure 4:
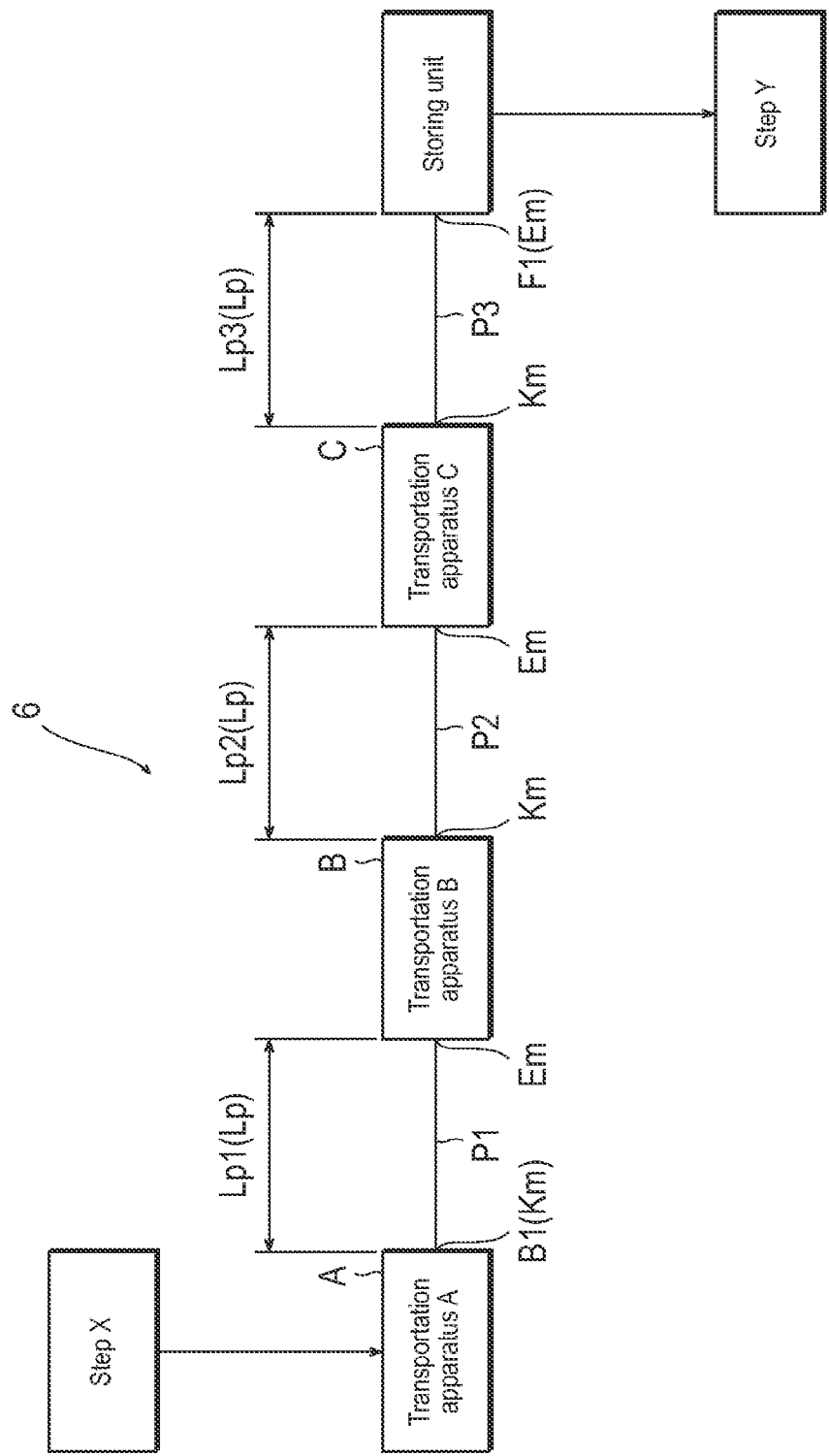
FIG. 4 is a drawing showing a schematic configuration of a transportation part to be used in the transportation method of the present invention.

FIG. 4 is a drawing showing a schematic configuration of one embodiment of the transportation method of the present invention. In this transportation method, the water-absorbing resin powder substance obtained in the step X is transported to an apparatus performing the step Y. The step Y is the next step of the step X. The step X is not limited, and also the step Y is not limited.

In the embodiment shown in FIG. 4, three pneumatic transportation apparatuses (A, B and C) are used. Transportation of the water-absorbing resin powder substance starts from the transportation apparatus A and reaches a storing unit via the transportation apparatus B and the transportation apparatus C. This storing unit is a storing unit for supplying the water-absorbing resin powder substance to an apparatus performing the step Y. This storing unit is one part of an apparatus performing the step Y.

The transportation apparatus A and the transportation apparatus B are connected by a transportation pipeline P1. The transportation apparatus B and the transportation apparatus C are connected by a transportation pipeline P2. The transportation apparatus C and the storing unit are connected by a transportation pipeline P3. That is, the transportation apparatus A, the transportation apparatus B and the transportation apparatus C are connected in series by the transportation pipeline. In this way, the transportation method for the water-absorbing resin powder substance of the present invention has characteristics in that two or more pneumatic transportation apparatuses are used in one transportation section, and the two or more pneumatic transportation apparatuses are connected by the transportation pipelines in series.

In the present application, "one transportation section" is a continuous section for transporting the water-absorbing resin powder substance. In the embodiment shown in FIG. 4, the start point B1 of the transportation section is a connection point of the transportation apparatus A and the transportation pipeline P1, and the final point F1 of the transportation section is a connection point of the transportation pipeline P3 and a storing unit. In this case, a section from the starting point B1 to the final point F1 is "one transportation section". Three transportation apparatuses are connected in series by the transportation pipelines P1, P2 and P3 between the starting point B1 and the final point F1. It should be noted that, other than installment linearly in a horizontal direction or in a vertical direction, there may be the case where the transportation pipeline is installed plane-likely, sterically, or in curved polygon-likely, and in this case, curvature radius of the curved part is preferably set at equal to or larger than 2 m. Number of the curved part in one transportation section is preferably set at 2 to 10 places, and more preferably 2 to 5 places. In addition, inner diameter of the pipeline is determined corresponding to production amount, however, it is preferably about 30 mm to 300 mm, still more preferably 50 mm to 200 mm, and particularly preferably about 70 mm to 160 mm.

Figure 5:
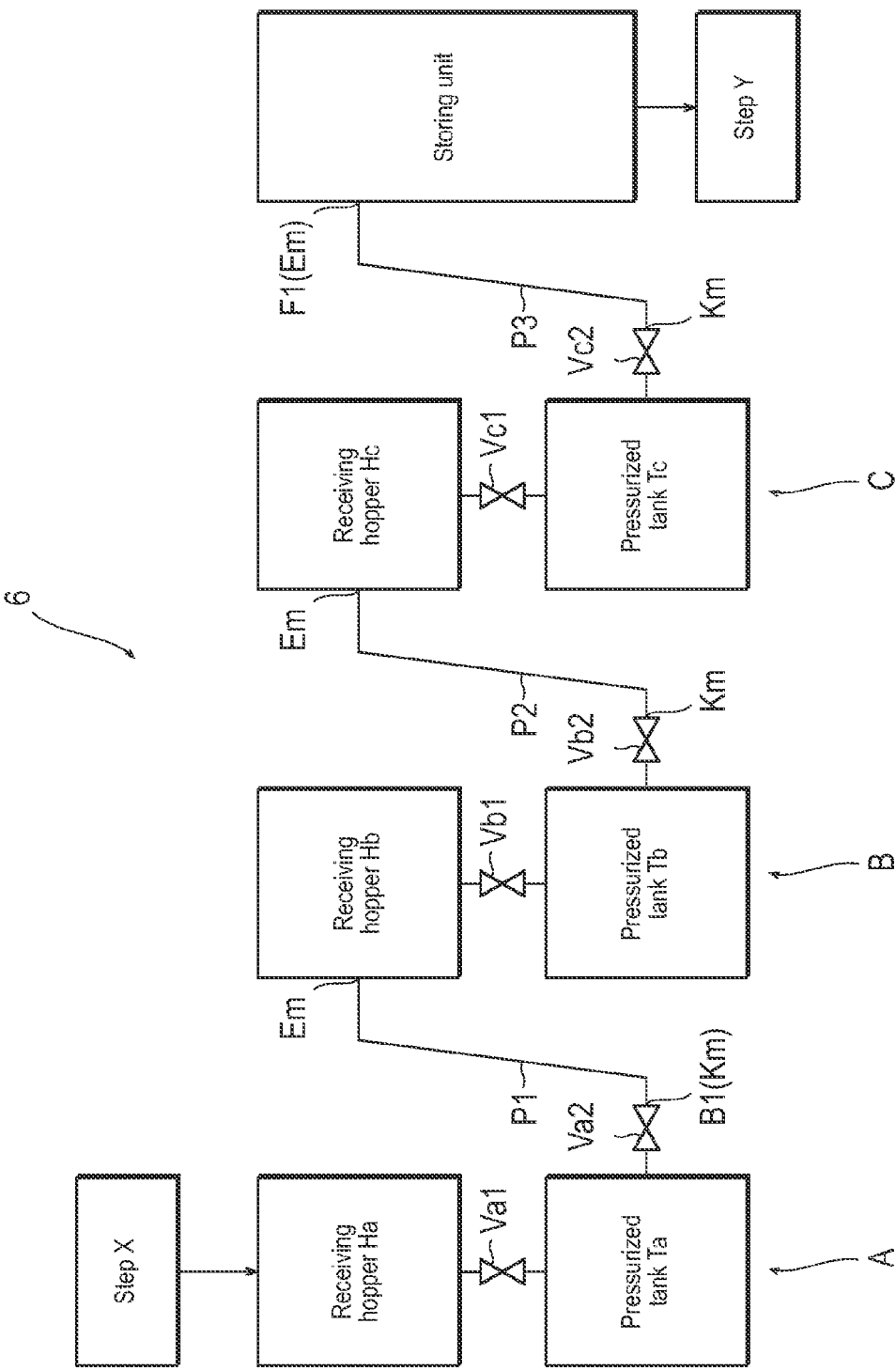
FIG. 5 is a schematic configuration view where

FIG. 5 is a schematic configuration view of the transportation part 6 shown FIG. 4 somewhat in detail.

As shown in FIG. 4, the transportation apparatus A has a receiving hopper Ha, a pressurized tank Ta (pressurized tank hopper), and valves (Va1, Va2). The receiving hopper Ha and the pressurized tank Ta are connected via the valve Va1. The valve Va2 is installed between the pressurized tank Ta and the transportation pipeline P1.

The transportation apparatus B has a receiving hopper Hb, a pressurized tank Tb and valves (Vb1, Vb2). The receiving hopper Hb and the pressurized tank Tb are connected via the valve Vb1. The valve Vb2 is installed between the pressurized tank Tb and the transportation pipeline P2.

The transportation apparatus C has a receiving hopper Hc, a pressurized tank Tc and valves (Vc1, Vc2). The receiving hopper Hc and the pressurized tank Tc are connected via the valve Vc1. The valve Vc2 is installed between the pressurized tank Tc and the transportation pipeline P3.

Although not shown, a compressor is connected to the pressurized tanks (Ta, Tb, Tc). By this compressor, the pressurized tanks (Ta, Tb, Tc) can be pressurized. Pressure in the pressurized tanks (Ta, Tb, Tc) can be set higher than atmospheric pressure. In addition, although not shown, a depressurizing valve is installed to the pressurized tanks (Ta, Tb, Tc). By opening the depressurizing valve, pressure in the pressurized tanks (Ta, Tb, Tc) is decreased down to atmospheric pressure, so as to release a pressurized state. Pressure in the pressurized tanks (Ta, Tb, Tc) may be adjusted as appropriate.

It should be noted that, in the receiving hopper (Ha, Hb, Hc), there is preferably provided a filter for purifying and discharging, the transportation air to be introduced accompanying with reception of the water-absorbing resin powder substance, to outside, and this filter is preferably a bag filter.

The receiving hoppers (Ha, Hb, Hc) are arranged on each of the pressurized tanks (Ta, Tb, Tc). When the valves (Va1, Vb1, Vc1) are opened, the water-absorbing resin powder substance present inside each of the receiving hoppers (Ha, Hb, Hc) falls into the pressurized tanks (Ta, Tb, Tc). In this way, the water-absorbing resin powder substance is supplied to the pressurized tanks (Ta, Tb, Tc). It should be noted that, in supplying the water-absorbing resin powder substance to the pressurized tanks (Ta, Tb, Tc), the pressurized tanks (Ta, Tb, Tc) are depressurized so as to release a pressurized state of the pressurized tanks (Ta, Tb, Tc).

In a conventional transportation method, one transportation apparatus has been used per one transportation section. On the contrary, in the present embodiment, a plurality (three) transportation apparatuses are used per one transportation section. In the present embodiment, in addition to the transportation apparatus A, the transportation apparatus B and the transportation apparatus C are connected in series.

Explanation will be given below on an action of each transportation apparatus sequentially.

Firstly, explanation will be given on transportation by the transportation apparatus A. The water-absorbing resin powder substance completed the step X is supplied to the receiving hopper Ha. In other words, the receiving hopper Ha receives the water-absorbing resin powder substance (a receiving step 1a). In the step 1a, the valve Va1 is closed. Then, the valve Va1 is opened to send the water-absorbing resin powder substance from the receiving hopper Ha to the pressurized tank Ta (a powder sending step 2a). In the step 2a, the valve Va2 is closed. In addition, in the step 2a, pressure in the pressurized tank Ta is the same as atmospheric pressure. Next, the valve Va1 and the valve Va2 are closed to pressurize ins ide the pressurized tank Ta (a pressurization step 3a). By supplying air from a compressor not shown, the pressurized tank Ta is pressurized. Next, the valve Va2 is opened to send the water-absorbing resin powder substance from the pressurized tank Ta to the receiving hopper Hb (a transportation step 4a). In the step 4a, by supplying air from a compressor not shown, the pressurized tank Ta is pressurized, as well as transportation air is sent to the transportation pipeline P1. In the step 4a, the valve Va1 is closed.

Explanation will be given next on transportation by the transportation apparatus B. By the transportation step 4a, the receiving hopper Hb receives the water-absorbing resin powder substance (a receiving step 1b). That is, the transportation step 4a and the receiving step 1b proceed at the same time. In the receiving step 1b, the valve Vb1 is closed. Then, the valve Vb1 is opened to send the water-absorbing resin powder substance from the receiving hopper Hb to the pressurized tank Tb (a powder sending step 2b). In the step 2b, the valve Vb2 is closed. In addition, in the step 2b, pressure in the pressurized tank Tb is the same as atmospheric pressure. Next, the valve Vb1 and the valve Vb2 are closed to pressurize inside the pressurized tank Tb (a pressurization step 3b). By supplying air from a compressor not shown, the pressurized tank Tb is pressurized. Next, the valve Vb2 is opened to send the water-absorbing resin powder substance from the pressurized tank Tb to the receiving hopper Hc (a transportation step 4b). In the step 4b, by supplying air from a compressor not shown, the pressurized tank Tb is pressurized, as well as transportation air is sent to the transportation pipeline P2. In the step 4b, the valve Vb1 is closed.

Explanation will be given next on transportation by the transportation apparatus C. By the transportation step 4b, the receiving hopper Hc receives the water-absorbing resin powder substance (a receiving step 1c). That is, the transportation step 4b and the receiving step 1c proceed at the same time. In the step 1c, the valve Vc1 is closed. Then, the valve Vc1 is opened to send the water-absorbing resin powder substance from the receiving hopper Hc to the pressurized tank Tc (a powder sending step 2c). In the step 2c, the valve Vc2 is closed. In addition, in the step 2c, pressure in the pressurized tank Tc is the same as atmospheric pressure. Next, the valve Vc1 and the valve Vc2 are closed to pressurize inside the pressurized tank Tc (a pressurization step 3c). By supplying air from a compressor not shown, the pressurized tank Tc is pressurized. Next, the valve Vc2 is opened to send the water-absorbing resin powder substance from the pressurized tank Tc to the storing unit (a transportation step 4c). In the step 4c, by supplying air from a compressor not shown, the pressurized tank Tc is pressurized, as well as transportation air is sent to the transportation pipeline P3. In the step 4c, the valve Vc1 is closed. It should be noted that pressure in the pressurized tank in a pressurized state is set at preferably equal to or higher than 0.05 MPa and equal to or lower than 0.7 MPa, and more preferably equal to or higher than 0.1 MPa and equal to or lower than 0.3 MPa.

The water-absorbing resin powder substance completed the step X moves sequentially along the transportation apparatus A, the transportation pipeline P1, the transportation apparatus B, the transportation pipeline P2, the transportation apparatus C, and the transportation pipeline P3 and reaches the storing unit relevant to the step Y. By succeeding transportation by the transportation apparatus A, transportation by the transportation apparatus B, and transportation by the transportation apparatus C in series, transportation between the step X and the step Y is attained. In a conventional transportation, the transportation apparatus B and the transportation apparatus C were not installed.

Figure 6:
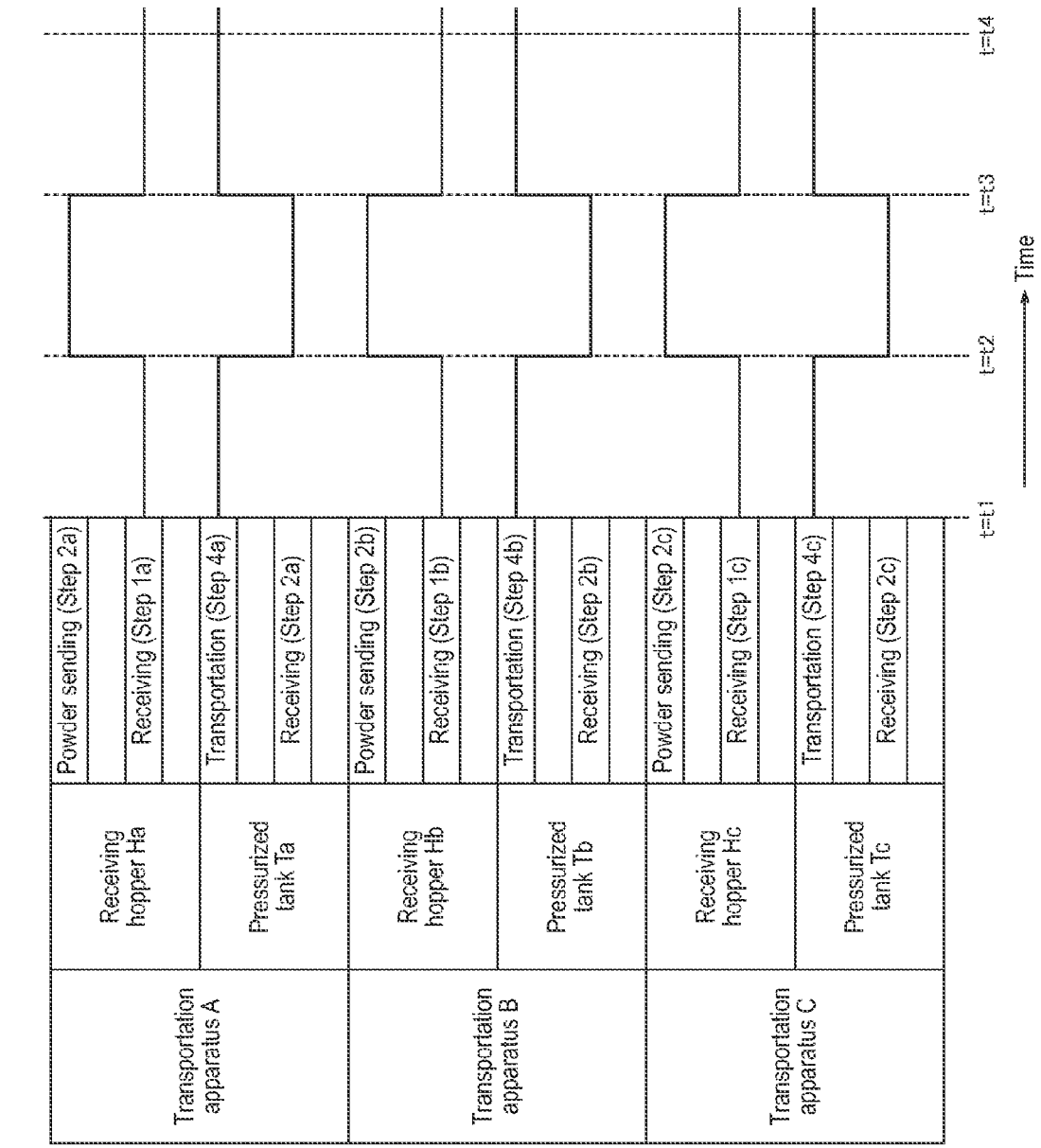
FIG. 6 is a drawing showing one example of a timing chart of each transportation apparatus relevant to the present invention.

FIG. 6 is a drawing showing an example of a timing chart of transportation of the present embodiment. In this timing chart, time passes from the left side to the right side of the chart. For example, in the receiving hopper Ha, the receiving step 1a is performed within time t1 to time t2; the powder sending step 2a is performed within time t2 to time t3; and the receiving step 1a is performed within time t3 to time t4. In addition, for example, in the pressurized tank Ta, the transportation step 4a is performed within time t1 to time t2; the receiving step 2a is performed within time t2 to time t3; and the transportation step 4a is performed within time t3 to time t4.

Open-close timing of a valve correlates with timing of step switching. For example, in the transportation apparatus A, at time t2, the valve Va1 is switched from "close" to "open", and the valve Va2 is switched from "open" to "close". For example, in the transportation apparatus A, at time t3, the valve Va1 is switched from "open" to "close", and the valve Va2 is switched from "close" to "open".

In the timing chart shown in FIG. 6, timing of step switching is coincident between the transportation apparatus A and the transportation apparatus B, and also timing of step switching is coincident between the transportation apparatus B and the transportation apparatus C. Because work time of pipeline blowing or depressurization or the like is different in each of the transportation apparatuses A, B and C, it is difficult practically to match timing completely as in FIG. 6. In addition, in the timing chart of FIG. 6, time required for a pressurization step or the like is not taken into consideration. The timing chart of FIG. 6 is described simply aiming at showing that three transportation apparatuses are workable at the same time.

As shown in FIG. 6, a transportation step by each transportation apparatus can proceed at the same time. In the present embodiment, a transportation step 4a, a transportation step 4b, and a transportation step 4c are proceeding at the same time. In this way, transportation by the transportation apparatus A, transportation by the transportation apparatus B, and transportation by the transportation apparatus C can be performed at the same time. By this proceeding of transportation at the same time, transportation efficiency (transportation amount per unit hour) can be enhanced.

The above problem of transportation efficiency or property decrease or the like tends to become obvious in production in an industrial scale. From this point of view, in the transportation method of the present invention, it is preferable that transportation amount of the water-absorbing resin powder substance is equal to or higher than 1000 kg/hr. [kg/hr] means transportation amount (kg) per unit hour. In view of decreasing the terminal linear velocity Vy, transportation amount of the water-absorbing resin powder substance is preferably equal to or lower than 10000 kg/hr, and preferably equal to or lower than 8000 kg/hr.

As shown in FIG. 6, a receiving step in each transportation apparatus also can progress at the same time. In the present embodiment, the receiving step 1a to the receiving hopper Ha, the receiving step 1b to the receiving hopper Hb, and the receiving step 1 to the receiving hopper Hc may be performed at the same time. In addition, the receiving step 2a to the pressurized tank Ta, the receiving step 2b to the pressurized tank Tb, and the receiving step 2c to the pressurized tank Tc may be performed at the same time. By this proceeding at the same time, transportation efficiency can be enhanced.

As shown in FIG. 6, in the same transportation apparatus, the receiving step by the receiving hopper, and the transportation method step by the pressurized tank may be performed at the same time. For example, in the transportation apparatus A, the receiving step 1a and the transportation step 4a may be performed at the same time. By transferring the water-absorbing resin powder substance to the receiving hopper in advance by utilizing time of the transportation step by the pressurized tank, transfer to be performed later (transfer from the receiving hopper to the pressurized tank) can be performed smoothly.

In the present embodiment, there is restriction that in the same receiving hopper, the receiving step and a powder sending step cannot be performed at the same time. In addition, in the present embodiment, there is also restriction that in the same pressurized tank, the receiving step and the transportation step cannot be performed at the same time. Within a range of these restrictions, a plurality of transportation apparatuses can be actuated at the same time in parallel. It should be noted that, when the valves (Va1, Va2, Vb1, Vb2, Vc1, Vc2) are changed to a continuous supply-type valve such as a rotary valve, it is possible to eliminate the above restriction. However, when the rotary valve is used, intermeshing generates at a rotation part of said rotary valve, and may generate fracture (particle fracture) of the water-absorbing resin powder substance. In addition, in this case, pressurized pressure varies caused by air leakage at a rotary valve part, and transportation may become unstable. In order to avoid such particle fracture or unstable transportation, it is preferable to use an open-close type valve, although it receives the above restriction.

It should be noted that, switching of the step can be performed by automatic control. This automatic control may be performed, based on various automatic detection data. As this automatic detection data, for example, powder substance amount in the receiving hopper, powder substance amount in the pressurized tank (the pressurized tank hopper), pressure in the pressurized tank (the pressurized tank hopper) and the like are included. Detection of powder substance amount in the receiving hopper, or in the pressurized tank (the pressurized tank hopper) can be performed, for example, by detecting position of the upper surface of the powder substance (powder level). This detection of powder level position can be performed by a known method such as an ultrasonic wave-type, a capacitance-type. Based on these detection data, automatic control may be performed. Automatic control may be performed by a known method such as a sequencer or a computer or the like.

Preferably, based on detection result of the powder level of the receiving hopper, open-close of the valve and start up of the pneumatic transportation apparatus are controlled automatically. For example, based on detection result that position of the powder level of the receiving hopper Ha exceeds predetermined upper limit value, control is performed so that the valve Va1 which has been closed is opened, the valve Va2 is closed and the transportation apparatus is stopped. On the contrary, for example, based on detection result that position of the powder level of the receiving hopper Ha becomes below predetermined lower limit value, control is performed so that the valve Va1 which has been opened is closed, the valve Va2 is opened and the transportation apparatus is actuated.

Preferably, based on detection result of pressure in the pressurized tank, open-close of the valve and start up of the pneumatic transportation apparatus are controlled automatically. For example, based on detection result that the pressure in the pressurized tank Ta exceeds predetermined upper limit value, control is performed so that the valve Va2 which has been closed is opened, and the transportation apparatus is actuated. On the contrary, for example, based on detection result that pressure in the pressurized tank Ta becomes below predetermined lower limit value, control is performed so that the valve Va1 which has been closed is opened, the valve Va2 is closed and the transportation apparatus is stopped. These automatic control programs may be determined in consideration of transportation efficiency or the like.

Transportation by the transportation part 6 is set as pneumatic transportation in high concentration. The transportation apparatuses (A, B, C) are pneumatic transportation apparatuses in high concentration. Although not shown in FIG. 4 and FIG. 5, as will be shown later in FIG. 7, the transportation apparatuses (A, B, C) each may have the pipelines for the secondary air (S1, S2, S3) for supplying the secondary air to the transportation pipelines (P1, P2, P3).

Figure 7:
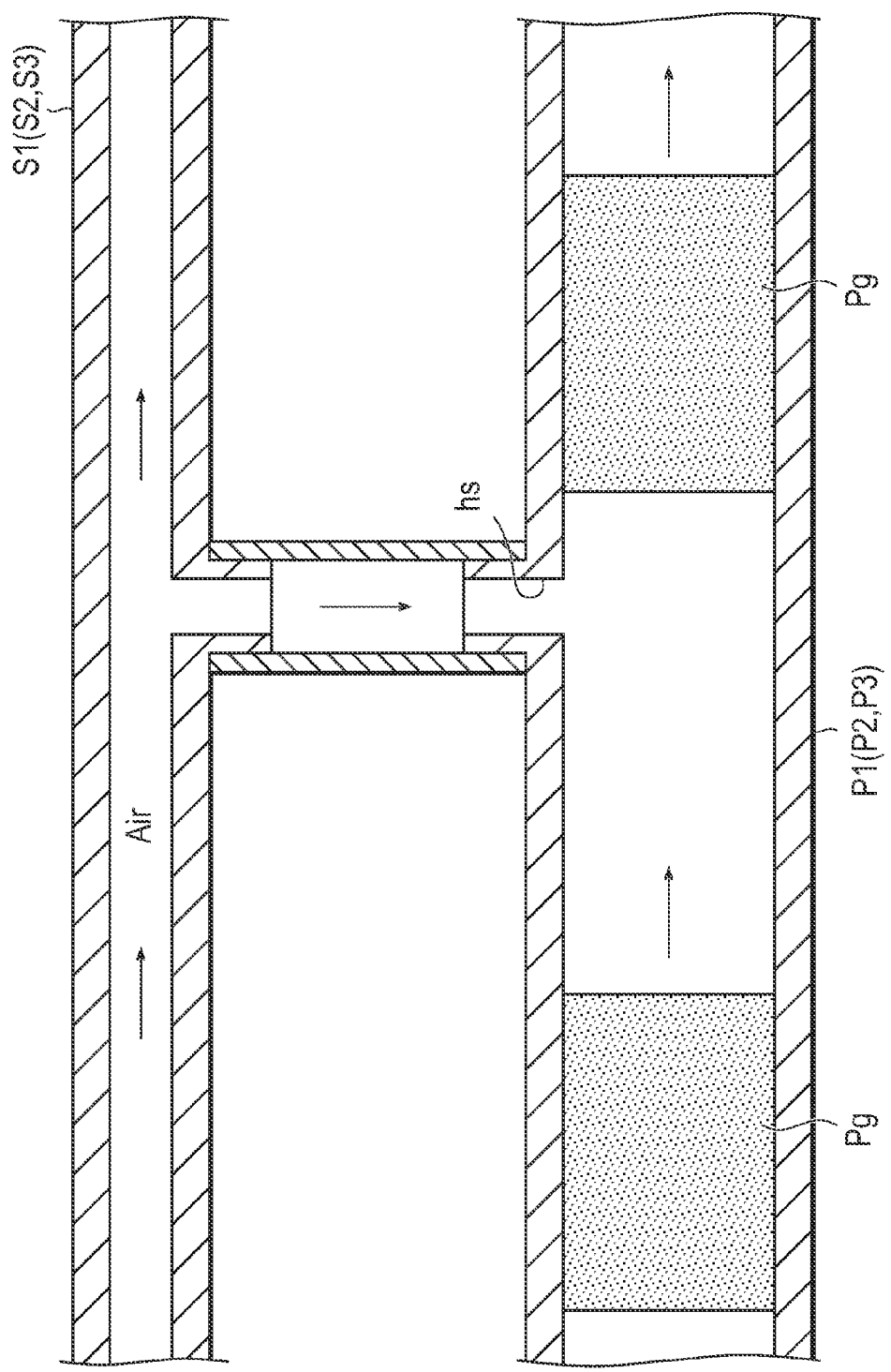
FIG. 7 is a cross-sectional view showing a transportation pipeline and a pipeline for the secondary air.

FIG. 7 is a cross-sectional view showing the transportation pipeline P1 and this pipeline for the secondary air S1. In addition, FIG. 7 also shows the transportation pipeline P2 and the transportation pipeline P3. That is, at the transportation pipeline P2, the pipeline for secondary air S2 is installed together, and at the transportation pipeline P3, the pipeline for secondary air S3 is installed together. Explanation will be given below only on the transportation apparatus A, however, situation is the same as for the transportation apparatus B and the transportation apparatus C. The pipeline for the secondary air S1 is installed together and extends to the transportation pipeline P1. The transportation pipeline P1 has an introduction hole hs of the secondary air. At a plurality of positions in a longitudinal direction of the transportation pipeline P1, the introduction hole hs of the secondary air is installed. At each of a plurality of positions of the introduction hole hs of the secondary air, the pipeline S1 for the secondary air is connected. It should be noted that, in FIG. 7, the introduction hole hs of the secondary air is drawn as a hole with large inner diameter, however, practically, the introduction hole hs of the secondary air is a nozzle (air nozzle).

By air introduced from the introduction hole hs of the secondary air, the water-absorbing resin powder substance as a substance to be transported is divided. The water-absorbing resin powder substance thus divided moves inside the transportation pipeline P1 while forming a plug Pg (refer to FIG. 7). In this way, pneumatic transportation in high concentration is defined as pneumatic transportation of the water-absorbing resin powder substance while forming the plug Pg. However, practically as shown in FIG. 7, it is rare that the plug Pg with regular shape is maintained always during transportation. In practical pneumatic transportation in high concentration, transportation is performed while repeating a series of behaviors. This series of behaviors are as follows: a deposited layer of the powder substance is formed at the bottom of the transportation pipeline; this deposited layer grows to become a hill-like bulk; this bulk grows further to become the plug Pg; this plug Pg moves; and this plug Pg collapses. The transportation apparatuses A, B and C are pneumatic transportation apparatuses in high concentration. In the present application, an apparatus for pneumatic transportation in high concentration means an apparatus attainable pneumatic transportation in high concentration.

When a terminal solid-gas ratio is equal to or larger than 10 (kg-resin/kg-air), that case is generally defined as pneumatic transportation in high concentration. The terminal solid-gas ratio is solid-gas ratio at the terminal Em of the transportation pipeline. This solid-gas ratio is a value obtained from mass (kg) of the water-absorbing resin powder substance divided with mass (kg) of air, and unit thereof is (kg-resin/kg-air). The terminal solid-gas ratio is calculated by dividing transportation amount of the water-absorbing resin powder substance per unit time in pneumatic transportation with mass of air consumed in transportation per unit time thereof. For example, when mass of the water-absorbing resin powder substance transported in 1 minute is 100 kg, and mass of air consumed in 1 minute thereof is 10 kg, the solid-gas ratio is calculated to be 100/10=10. When mass measurement of air amount consumed is difficult, pressure and volume flow rate of air are determined by a flow meter or the like, and from these values it may be calculated using average molecular weight of air.

In the present embodiment, three pneumatic transportation apparatuses are provided in one transportation section, and these pneumatic transportation apparatuses are connected in series by the transportation pipelines (P1, P2, P3). Because, by this configuration, one transportation section is divided by a plurality of transportation apparatuses, transportation distance by a single transportation apparatus is reduced. For example, in the above embodiment, distance from the starting point B1 to the final point F1 of the transportation section is assumed to be 100 m. In this case, in a conventional system, the transportation pipeline of 100 m was necessary. On the contrary, in the above embodiment, for example, length of the transportation pipeline P1 can be set 33.3 m, length of the transportation pipeline P2 can be set 33.3 m, and length of the transportation pipeline P3 can be set 33.3 m. That is, transportation distance by a single transportation apparatus can be made shorter than distance of the transportation section.

Such a series connection of pneumatic transportation apparatuses has high effectiveness when the transportation section is long. From this viewpoint, total length Lt of the transportation pipelines included in the one transportation section is preferably equal to or longer than 50 m, more preferably equal to or longer than 70 m, and more preferably equal to or longer than 100 m. In view of suppressing unit number of the transportation apparatus, the total length Lt is preferably equal to or shorter than 1000 m, more preferably equal to or shorter than 500 m, and more preferably equal to or shorter than 200 m. For example, in the embodiment shown in FIG. 4, this total length Lt is total of length Lp1 of the transportation pipeline P1, length Lp2 of the transportation pipeline P2, and length Lp3 of the transportation pipeline P3. That is, it is expressed as follows:

$$Lt = Lp1 + Lp2 + Lp3 \qquad \text{[Expression 1]}$$

In view of reducing the terminal linear velocity Vy and suppressing blocking phenomenon, each length Lp of the transportation pipelines included in the one transportation section is preferably equal to or shorter than 50 m, more preferably equal to or shorter than 40 m, and more preferably equal to or shorter than 35 m. In the case where unit number of the transportation apparatuses was increased excessively to shorten the length Lp, transportation efficiency may decrease in some cases contrarily. From this viewpoint, the length Lp is preferably equal to or longer than 30 m. In the embodiment shown in FIG. 4, the length Lp1 of the transportation pipeline P1 is an example of the length Lp, the length Lp2 of the transportation pipeline P2 is also an example of the length Lp, and the length Lp3 of the transportation pipeline P3 is also an example of the length Lp.

In view of shortening the length Lp, it is preferable that division of the transportation section by the transportation apparatus is set equally. Therefore, when unit number of the pneumatic transportation apparatuses connected in series at one transportation section is assumed to be N (N is an integer of equal to or larger than 2), it is preferable that the total length Lt in that transportation section and length Lp of all of the transportation pipelines contained in that transportation section satisfy the following relation (1), and more preferably satisfy the relation (2).

[Expression 2]

$$Lt/(N+1) \leq Lp \leq Lt/(N-1) \quad (1)$$

$$Lt/(N+0.5) \leq Lp \leq Lt/(N-0.5) \quad (2)$$

When transportation distance by a single transportation apparatus is long, high pressurization is required to increase transportation efficiency while suppressing blocking phenomenon (clogging). Caused by this high pressurization, linear velocity at the terminal of the transportation pipeline increases. The linear velocity indicates moving velocity of the water-absorbing resin powder substance, and substantially the same as moving velocity of air. Largeness of this linear velocity is measured along a longitudinal direction of the transportation pipeline. The linear velocity is calculated, for example, by measuring air flow amount flowing in the pipeline per unit time, with a flow meter or the like, and dividing this value with cross-sectional area of the transportation pipeline. As shown in FIG. 4 and FIG. 5, in the present embodiment, terminal Em of the transportation pipeline is present at 3 (three) places.

In the present application, linear velocity of the water-absorbing resin powder substance at the starting point Km of the transportation pipeline is referred to also as the initial linear velocity Vx. In addition, pressure of air at the starting point Km of the transportation pipeline is referred to also as the initial pressure Px. In addition, linear velocity of the water-absorbing resin powder substance at the terminal Em of the transportation pipeline is referred to also as the terminal linear velocity Vy. In addition, pressure of air at the terminal Em of the transportation pipeline is referred to also as the terminal pressure Py.

In the same transportation pipeline, air pressure tends to decrease at the nearer position to the terminal Em of the transportation pipeline. In the same transportation pipeline, the terminal pressure Py is lower than the initial pressure Px. On the other hand, in the same transportation pipeline, the linear velocity tends to increase at the nearer position to the terminal Em of the transportation pipeline. In the same transportation pipeline, the terminal linear velocity Vy is higher than the initial linear velocity Vx. Usually, the terminal linear velocity Vy is the maximum linear velocity in the same transportation pipeline.

When the terminal linear velocity Vy decreases, collision speed of the particles and the transportation pipeline, or collision speed of the particles themselves decreases. That is, by the low terminal linear velocity Vy, damage which the water-absorbing resin powder substance receives can be suppressed. In view of suppressing property decrease of the water-absorbing resin powder substance, the terminal linear velocity Vy is preferably equal to or lower than 15 m/s, more preferably equal to or lower than 13 m/s and more preferably equal to or lower than 10 m/s. As described above, in the present invention, because transportation by a plurality of transportation apparatuses is possible to proceed at the same time, decrease in the terminal linear velocity Vy and transportation efficiency can be satisfied at the same time. In view of transportation efficiency, the terminal linear velocity Vy is preferably equal to or higher than 7 m/s.

When the secondary air is used, it is preferable to adjust supply of the secondary air so that the terminal linear velocity Vy is within the preferable range.

As described above, pneumatic transportation in high concentration is performed at lower speed as compared with pneumatic transportation in low concentration. However, because the present invention is capable of performing transportation by a plurality of transportation apparatuses at the same time, transportation efficiency can be enhanced under condition of low speed transportation. A preferable range of the terminal linear velocity Vy is a velocity range suitable for pneumatic transportation in high concentration.

The transportation section relevant to the present invention may have branched transportation routes. In this case, as for each of the branched transportation routes, the present invention can be satisfied. For example, the case where the transportation section is branched to two at a branching point D1 positioned at the middle between the starting point B1 and the final point of the transportation section is considered. In this case, the final point F1 of the transportation section results in being present at two positions. When each of the final points F1 at these two positions are assumed to be the first final point F11 and the second final point F12, the following first route and the following second route may be recognized in this branched transportation section.

The first route: A route from the start point B1 of the transportation section to the first final point F11 via the branching point D1.

The second route: A route from the start point B1 of the transportation section to the first final point F12 via the branching point D1.

In this case, for example, when the transportation apparatuses are connected in series in the first route, the present invention can be satisfied. Similarly, when the transportation apparatuses are connected in series in the second route, the present invention can be satisfied. It should be noted that, the branching point D1 may be formed by branching of the transportation pipeline, or may be formed by the transportation apparatus.

It is preferable that a filter which is capable of capturing the fine powders is installed at the receiving hopper. This filter is capable of capturing the fine powders present in gas in the receiving hopper. By making gas in the receiving hopper passed through the filter by suction under reduced pressure or the like, the fine powders can be captured. As this filter, a bag filter is preferable. By this filter, pneumatic transportation can be performed while attaining reduction of the fine powders. As the filter, a membrane filter is preferable. This membrane filter is superior in trapping efficiency. In addition, because this membrane filter is capable of shaking off the fine powders easily, blocking seldom occurs, and trapping efficiency little decreases due to use. As this filter, a filter superior in trapping efficiency for JIS 12-type carbon black (particle diameter: 0.03 µm to 0.2 µm) is preferable. In view of enabling to collect the fine powders efficiently, this trapping efficiency is preferably equal to or higher than 90%, more preferably equal to or higher than 95%, still more preferably equal to or higher than 99.9%, and particularly preferably equal to or higher than 99.99%. This trapping efficiency can be measured, for example, by a method of JIS B9908, type 1. In a simplified way, the trapping efficiency can be measured using a commercial dust meter. This trapping efficiency can be obtained substantially, based on an amount of the fine powders before passing through the filter, and the amount of the fine powders after passing through the filter. Specifically, from the amount of the fine powders before passing through the filter WO (mg/m$^3$), and the amount of the fine powders after passing through the filter Wf (mg/m$^3$), the trapping efficiency can be calculated by the following expression. It should be noted that, as this dust meter, for example, a product name "P5L Digital Dust Meter", manufactured by Shibata Scientific Technology, Ltd. is included.

Trapping efficiency (%)=(1−Wf/WO)×100      [Expression 3]

As a material of the transportation pipeline, it is preferably to use stainless steel. The inner surface of the transportation pipeline is preferably mirror finished. By this mirror finish, damage which the water-absorbing resin powder substance receives can be suppressed. By mirror finishing of stainless steel, damage suppression effect is further enhanced. As the stainless steel, SUS304, SUS316, SUS316L or the like is included. In addition, the mirror finishing means smoothening to attain a surface roughness specified by JIS B 0601-1982 of equal to or smaller than 6.3 S. This "S" means the maximum value of maximum height (μm) of surface irregularity. Such a surface roughness can be measured with a stylus-type surface roughness meter (JIS B 0651) or a light wave interference-type surface roughness meter (JIS B 0652) or the like.

A method for controlling temperature of the water-absorbing resin powder substance during transportation is not limited. Preferably, a means for heating the storage tank such as a hopper or the transportation pipeline from outside may be used. For example, by arranging a copper pipe at the exterior surface of storage tank and/or the transportation pipeline, and making steam passed inside the copper pipe, temperature of the water-absorbing resin powder substance can be maintained at equal to or higher than predetermined temperature. In addition, it is preferable that the transportation pipeline is not exposed outdoors. In view of controlling temperature of the water-absorbing resin powder substance during transportation, it is preferable that the transportation pipeline is arranged indoors.

[Property of the Water-Absorbing Resin Powder Substance]

(Particle Shape)

Particle shape of the water-absorbing resin powder substance is not especially limited. As this particle shape, powders of spherical-shape, nearly spherical-shape, irregular pulverized shaped substance (which is a pulverized substance), bar shape, polygonal shape, sausage shape (for example; refer to U.S. Pat. No. 4,973,632 specification), a particle with wrinkles (for example; refer to U.S. Pat. No. 5,744,564 specification) and the like are included. They may be a single particle, or granulated particle, or a mixture of the single particle and the granulated particle. In addition, the particle may be a foamed porous one. Preferably, a single particle with irregular pulverizedshaped and/or a granulated substance thereof are included.

(Particle Size)

Mass average particle diameter (D50) of the water-absorbing resin (water-absorbing resin powder substance) before surface cross-linking and/or in the final product is preferably 200 to 600 μm, more preferably 200 to 550 μm, still more preferably 250 to 500 μm, and particularly preferably 350 to 450 μm. In addition, the particle below 150 μm is preferably as less as possible, and usually adjusted at 0 to 5% by mass, preferably 0 to 3% by mass, and particularly preferably 0 to 1% by mass. Further, the particle equal to or larger than 850 μm is preferably as less as possible, and usually adjusted at 0 to 5% by mass, preferably 0 to 3% by mass, and particularly preferably 0 to 1% by mass. Logarithm standard deviation (σζ) of particle size distribution is preferably set at 0.20 to 0.40, more preferably 0.27 to 0.37, and still more preferably 0.25 to 0.35. As for these measuring methods, as a method using a standard sieve, for example, it is described in WO 2004/069915 pamphlet or EDANA-ERT420.2-02.

It is preferable that absorbency against non-pressure (CRC) for a normal saline solution of the water-absorbing resin powder substance after surface cross-linking, and still more after transportation is equal to or higher than 15 g/g. Absorbency against non-pressure (CRC) of the water-absorbing resin powder substance before surface cross-linking is not especially limited, however, it is preferably equal to or higher than 15 g/g. The absorbent articles such as disposable diapers, in which this water-absorbing resin powder substance is used, absorb body fluid or the like well. From this viewpoint, absorbency (CRC) after surface cross-linking or before surface cross-linking is preferably equal to or higher than 20 g/g, still more preferably equal to or higher than 25 g/g, and particularly preferably equal to or higher than 30 g/g. In view of performance of the absorbent articles, the higher this absorbency (CRC) is the better. However, in the view point that the water-absorbing resin powder substance can be produced stably and obtained at low cost, this absorbency (CRC) is preferably equal to or lower than 60 g/g, still more preferably equal to or lower than 50 g/g, and particularly preferably equal to or lower than 35 g/g. It should be noted that, in the present invention, absorbency against non-pressure (CRC) is synonymous as free swelling time (GV), and CRC may be referred to as GV in some cases.

In measurement of absorbency against non-pressure (CRC), about 0.2 g of the water-absorbing resin powder substance is prepared. And firstly, mass W1 of this water-absorbing resin powder substance is measured. This water-absorbing resin powder substance is put uniformly in a bag made of nonwoven fabric (60 mm×85 mm). This bag is immersed in a normal saline solution with a temperature adjusted at 25±2° C., for 30 minutes. Next, this bag is pulled up, and put into a centrifugal separation apparatus (a compact-type centrifugal separation apparatus, model-type: H-122, manufactured by Kokusan Co., Ltd.). This centrifugal separation apparatus is operated under condition of 250 G (250×9.81 m/s$^2$) for 3 minutes. Mass W2 (g) of the bag thereafter is measured. On the other hand, similar processing is performed on the bag not containing the water-absorbing resin powder substance, and mass W3 (g) thereof is measured. Absorbency against non-pressure (CRC) is calculated according to the following Expression.

CRC (g/g)=[(W2−W3)/W1]−1      [Expression 4]

Absorbency against pressure (AAP) (ERT420.2-02, under condition of a load of 50 g/cm$^2$) for a normal saline solution under pressure of the water-absorbing resin powder substance after surface cross-linking, and still more after transportation is preferably 15 to 50 g/g, more preferably 18 to 45 g/g, particularly preferably 20 to 45 g/g, and most preferably 20 to 45 g/g. The absorbent articles such as disposable diapers, in which this water-absorbing resin powder substance is used, absorb body fluid or the like well. It should be noted that, absorbency against pressure (AAP) is absorbency (unit: g/g) after swelling under a load of 21 g/cm$^2$, for 1 hour for a 0.9% aqueous solution of sodium chloride. It should be noted that, hereafter in Examples of the present application, "AAP" is defined as a value measured similarly except that the load is changed to 50 g/cm².

Saline flow conductivity (hereafter referred to SFC as well) for the 0.69% by mass normal saline aqueous solution, of the water-absorbing resin powder substance is a value showing liquid permeability in swelling of the water-absorbing resin powder substance or the water-absorbing agent. The larger is this SFC value, the water-absorbing resin powder substance shows to have the higher liquid permeability. SFC of the water-absorbing resin powder substance (a surface cross-linked polyacrylic acid (salt)-based water-absorbing resin powder substance) is preferably equal to or larger than 10 ($\times 10^{-7} \cdot cm^3 \cdot s \cdot g^{-1}$), more preferably 20 to 1000 ($\times 10^{-7} \cdot cm^3 \cdot s \cdot g^{-1}$), and still more preferably 30 to 500 ($\times 10^{-2} \cdot cm^3 \cdot s \cdot g^{-1}$). In the present invention, because the initial linear velocity Vx can be suppressed, decrease in SFC during transportation can be suppressed. Such an evaluation is performed in accordance with the SFC test described in U.S. Pat. No. 5,849,405 specification.

It should be noted that, in general, AAP, CRC and SFC tend to be contradictory, however, by adopting the above range, the water-absorbing resin having these balanced properties can be provided.

Moisture content (specified by reduced amount by drying in heating 1 g at 180° C. for 3 hours) of the water-absorbing resin powder substance before and after transportation is preferably equal to or lower than 5% by weight, more preferably equal to or lower than 3% by weight. This specification is applicable similarly to any of the cases that the water-absorbing resin powder substance is the water-absorbing resin before surface cross-linking, and the water-absorbing resin after surface cross-linking. Certain amount of water, preferably equal to or more than 0.1% by weight, more preferably equal to or more than 0.5% by weight, is advantageous in that absorbing speed or property after transportation can be maintained and enhanced. Adjustment of the moisture content may be performed as appropriate by adjusting heating condition or the addition amount of water as needed.

In the transportation method of the present invention, in the view point that superior property of the water-absorbing resin powder substance can be maintained stably and blocking phenomenon can be suppressed, as gas composing air flow, it is preferable that dried air is used. Dew point of this gas is preferably equal to or lower than −10° C., more preferably equal to or lower than −15° C., and particularly preferably equal to or lower than −20° C. Other than using dried air, heated air may be used. A heating method is not especially limited, and gas may be heated directly using a heat source, or gas to be passed may be heated indirectly by heating the transportation part or the pipeline. Temperature of this heated gas is preferably equal to or higher than 30° C., more preferably equal to or higher than 50° C., and still more preferably equal to or higher than 70° C.

Pneumatic transportation of the present invention may be transportation in a pressurized state or transportation in a reduced pressure state. In the case of transportation in a reduced pressure state, the water-absorbing resin powder substance is transported by suction force of the transportation apparatus. In this case, inside pressure of the pipeline is set lower than atmospheric pressure. Preferably, pneumatic transportation of the present invention is set transportation in a pressurized state as in the embodiment. In the case of transportation in a pressurized state, the water-absorbing resin powder substance is transported by high pressure generating from the transportation apparatus. The embodiment is transportation method in pressurized state. In transportation in pressurized state, inside pressure of the pipeline is set higher than atmospheric pressure. By setting a pressurized state, it becomes difficult for dust or the like to intrude inside the transportation apparatus or the pipeline. This transportation in a pressurized state contributes to reduction of foreign substances contained in the water-absorbing resin powder substance. Reduction of the foreign substances is capable of contributing to property enhancement of the water-absorbing resin powder substance.

EXAMPLES

Effect of the present invention will be clarified below with reference to Examples, however, the present invention should not be construed restrictive, based on description of these Examples. It should be noted that, in the present description, "parts by mass" and "% by mass" are synonymous to "parts by weight" and "% by weight", respectively. In addition, a measurement method for SFC hereafter is as described above.

Production Example 1 of the Water-Absorbing Resin Powder Substance

The water-absorbing resin powder substance was produced continuously using a continuous production apparatus (a production capacity of about 1500 kg per one hour) of the water-absorbing resin, which is capable of performing each step continuously, and is composed by being connected with the polymerization step (static polymerization on a belt), the gel grain refining (crushing) step, the drying step, the pulverization step, the classification step, the surface cross-linking step (a spray step of the surface cross-linking agent and a heating step), the cooling step, the granule sizing step, and the transportation step between each step.

Firstly, a monomer aqueous solution (1) containing a partial sodium salt of acrylic acid with 75% by mole neutralized was prepared. This monomer aqueous solution (1) contains polyethylene glycol diacrylate (average number of n=9), as an inner cross-linking agent, and content of this polyethylene glycol diacrylate monomer concentration was adjusted to 0.06% by mole, relative to total mole number of the monomer. In this monomer aqueous solution (1), concentration of the monomer (the partial sodium salt of acrylic acid) was set to 38% by mass. The resultant monomer aqueous solution (1) was fed continuously with a metering pump, and by blowing nitrogen gas continuously in the midway of the pipeline, oxygen concentration of this monomer aqueous solution (1) was adjusted to equal to or lower than 0.5 ppm. It should be noted that, the "average number of n" means average number of polymerization degree of ethylene oxide in the polyethylene glycol chain.

Next, to the monomer aqueous solution (1), sodium persulfate and L-ascorbic acid were mixed continuously with line mixing. In this line mixing, ratio of mixing of sodium persulfate was set 0.12 g relative to 1 mole of the monomer and L-ascorbic acid was set 0.005 g relative to 1 mole of the monomer. The continuous mixture obtained by this line mixing was supplied to a flat surface steel belt having weirs at both sides thereof, so that thickness thereof became about 30 mm to perform static aqueous solution polymerization continuously for 30 minutes to obtain a water-containing gel-like cross-linked polymer (1). This water-containing gel-like cross-linked polymer (1) was segmentalized to about 2 mm using a meat chopper with a pore diameter of 7 mm, and this was spread and mounted on a moving porous plate of a continuous air-flow band dryer to a thickness of 50 mm, to be subjected to drying at 185° C. for 30 minutes, to obtain a dried polymer. Whole mass of the relevant dried polymer was continuously supplied to a three-stage roll mill to be pulverized. Roll gap configuration of this three-stage roll mill was from the top, 1.0 mm/0.55 mm/0.42 mm. After this pulverization, it was classified by a classification apparatus having a metal mesh with a sieve mesh size of 850 μm and 150 μm to obtain the water-absorbing resin powder substrate (the particulate water-absorbing resin) (1), wherein about 98% by mass was the particles with 150 μm to 850 μm, and ratio of the particles smaller than 150 μm was about 2% by mass. CRC of this water-absorbing resin powder substrate (1) was 35 g/g.

Still more, this water-absorbing resin powder substrate (1) was continuously supplied in 1500 kg/hr to a high speed continuous mixing machine (Turbulizer/1000 rpm), and the surface treatment agent solution was mixed by spraying with a sprayer. This surface treatment agent solution was composed of 1,4-butanediol, propylene glycol and pure water. Specifically, this surface treatment agent solution was composed of and mixed with 1,4-butanediol, propylene glycol and pure water in 0.3 part by mass, 0.5 part by mass and 2.7 part by mass, respectively, relative to 100 parts by mass of the water-absorbing resin. Next, after the resultant mixture was subjected to heat processing continuously at 198° C. for 40 minutes with a paddle dryer, it was forced to cool down to 60° C. using a similar paddle dryer (the cooling step). Still more, a substance passed 850 μm was classified using a sieving apparatus, and a product on the mesh (a substance not passed 850 μm) was pulverized again and mixed with the substance passed 850 μm, to obtain the water-absorbing resin power substance A as a granule sized product, where the whole amount was the substance passed 850 μm. It should be noted that, the water-absorbing resin power substance A had a CRC of 30.5 (g/g), an SFC of 30.0 ($\times 10^{-7} \cdot cm^3 \cdot s \cdot g^{-1}$), and an AAP of 25.5 (g/g).

Production Example 2 of the Water-Absorbing Resin Powder Substance

The water-absorbing resin powder substance B was obtained similarly as in Production Example 1, except that 1% by mass of a 50% by mass aqueous solution of aluminum sulfate was added relative to 100 parts by mass of the water-absorbing resin powder substrate (1), in the cooling step. It should be noted that, the water-absorbing resin powder substance B had a CRC of 30.0 (g/g), an SFC of 50.0 ($\times 10^{-7} \cdot cm^3 \cdot s \cdot g^{-1}$), and an AAP of 24.5 (g/g).

Production Example 3 of the Water-Absorbing Resin Powder Substance

The water-absorbing resin powder substance was produced continuously using a continuous production apparatus (a production capacity of about 1500 kg per one hour) of the water-absorbing resin, which is capable of performing each step continuously, and is composed by being connected with the polymerization step (static polymerization on a belt), the gel grain refining (crushing) step, the drying step, the pulverization step, the classification step, the surface cross-linking step (a spray step of the surface cross-linking agent and a heating step), the cooling step, the granule sizing step, and the transportation step between each step.

Firstly as a monomer aqueous solution (2), an aqueous solution containing a partial sodium salt of acrylic acid with 75% by mole neutralized was prepared. This monomer aqueous solution (2) contains polyethylene glycol diacrylate (average number of n=9), as an inner cross-linking agent, and content of this polyethylene glycol diacrylate monomer concentration was adjusted to 0.1% by mole, relative to total mole number of the monomer. In this monomer aqueous solution (2), concentration of the monomer (the partial sodium salt of acrylic acid) was set to 38% by mass. The resultant monomer aqueous solution (2) was fed continuously with a metering pump, and by blowing nitrogen gas continuously in the midway of the pipeline, oxygen concentration of this monomer aqueous solution (2) was adjusted to equal to or lower than 0.5 ppm.

Next, to the monomer aqueous solution (2), sodium persulfate and L-ascorbic acid were mixed continuously with a line mixer. In this line mixing, ratio of mixing of sodium persulfate was set 0.12 g relative to 1 mole of the monomer and L-ascorbic acid was set 0.005 g relative to 1 mole of the monomer. The continuous mixture obtained by this line mixing was supplied to a flat surface steel belt having weirs at both sides thereof, so that thickness thereof became about 30 mm to perform static aqueous solution polymerization continuously for 30 minutes to obtain a water-containing gel-like cross-linked polymer (2). This water-containing gel-like cross-linked polymer (2) was segmentalized to about 2 mm using a meat chopper with a pore diameter of 7 mm, and this was spread and mounted on a moving porous plate of a continuous air-flow band dryer to a thickness of 50 mm, to be subjected to drying at 185° C. for 30 minutes, to obtain a dried polymer. Whole mass of the relevant dried polymer was continuously supplied to a three-stage roll mill to be pulverized. Roll gap configuration of this three-stage roll mill was from the top, 1.0 mm/0.4 mm/0.3 mm. After this pulverization, it was classified by a classification apparatus having a metal mesh with a sieve mesh size of 710 μam, and a metal mesh with a sieve mesh size of 150 μm to obtain the water-absorbing resin powder substrate (the particulate water-absorbing resin) (2), wherein about 98% by mass was the particles with 150 μm to 710 μm, and ratio of the particles smaller than 150 μm was about 2% by mass. CRC of this water-absorbing resin powder substrate (2) was 33 g/g.

Further, this water-absorbing resin powder substrate (2) was continuously supplied in 1500 kg/hr to a high speed continuous mixing machine (Turbulizer/1000 rpm), and the surface treatment agent solution was mixed by spraying with a sprayer. This surface treatment agent solution was composed of 1,4-butanediol, propylene glycol and pure water. Specifically, this surface treatment agent solution was composed of and mixed with 1,4-butanediol, propylene glycol and pure water in 0.4 part by mass, 0.6 part by mass and 3.0 part by mass, respectively, relative to 100 parts by mass of the water-absorbing resin. Next, after the resultant mixture was subjected to heat processing continuously at 200° C. for 40 minutes with a paddle dryer, it was forced to cool down to 60° C. using a similar paddle dryer (the cooling step). In this cooling step, 1% by mass of a 50% ammonium sulfate aqueous solution was added relative to 100% by mass of the water-absorbing resin powder substrate (2). Further, a substance passed 710 μm was classified using a sieving apparatus, and a product on the mesh (a substance not passed 710 μm) was pulverized again and mixed with the substance passed 710 μm, to obtain the water-absorbing resin power substance C as a granule sized product, where the whole amount was the substance passed 710 μm. It should be noted that the water-absorbing resin power substance C had a CRC of 27.0 (g/g), an SFC of 120.0 ($\times 10^{-7} \cdot cm^3 \cdot s \cdot g^{-1}$), and an AAP of 23.8 (g/g).

Production Example 4 of the Water-Absorbing Resin Powder Substance

The water-absorbing resin powder substance (particulate water-absorbing resin) (3) having nearly the same particle size as in Production Example 2, and a CRC of 33 g/g, was obtained by performing similarly as in Production Example 3, except that recycling of the fine powders was performed by kneading about 12% by weight of the fine powders removed (substances passed through 150 μm) together with a water-containing gel-like cross-linked polymer (2), with a meat chopper, in accordance with JP-A-2001-079829, after pulverization with a three-stage roll mill and classifying to 710 to 150 μm. By observation with an electron microscope, the water-absorbing resin powder substance (3) was found to include a granulated substance, where the fine powders are unified to particles with a particle diameter of 710 to 150 μm, and thus yield and water-absorbing speed (for example, Vortex or FSR/as for a measurement method, refer to U.S. Pat. No. 6,849,665 specification) were enhanced due to recycling of the fine powders, as compared with the water-absorbing resin powder substance (2). It should be noted that, the recycling of the fine powders to similar water-containing gel is possible also by a continuous kneader instead of the meat chopper.

Example 1

A transportation test of the water-absorbing resin powder substance was performed using a transportation part similar to the transportation part 6 shown in FIG. 4 and FIG. 5, and connecting three transportation apparatuses in series. Testing time was about 10 minutes as total time required in performing each one time of transportation by each transportation machine. As the water-absorbing resin powder substance, the water-absorbing resin powder substance A obtained in Production Example 1 was used. Inner diameter of the transportation pipelines (P1, P2, and P3) was each 83.1 mm. The transportation pipelines (P1, P2, and P3) each has a horizontal part and a vertical part, and length of the transportation pipeline P1 was 38 m for the horizontal part, and 5 m for the vertical part. Length of the transportation pipeline P2 was 34 m for the horizontal part, and 5 m for the vertical part. Length of the transportation pipeline P3 was 37 m for the horizontal part, and 20 m for the vertical part, and the terminal part of P3 was connected to a storage hopper. Terminal linear velocity Vy was 9.9 m/s at the terminal Em of the transportation pipeline P1, it was 10.5 m/s at the terminal Em of the transportation pipeline P2, and it was 11.5 m/s at the terminal Em of the transportation pipeline P3. Transportation capacity per unit hour of the transportation apparatus A in operation was 5972 kg/hr. Transportation capacity per unit hour of the transportation apparatus B in operation was 6327 kg/hr. Transportation capacity per unit hour of the transportation apparatus C in operation was 6674 kg/hr. "Transportation capacity" here is a value of total time required in performing each one time of transportation by each transportation machine (time totaling for transportation preparation, powder substance charging, pressurization, transportation and pipeline blowing) converted to transportation amount per unit hour. Transportation amount per unit hour in the whole transportation sections was 4500 kg/hr.

Description will be given here on reason for no-coincidence of transportation amount per unit hour in the whole transportation section with transportation capacity of each transportation apparatus described above. Transportation capacity indicates maximum transportation capacity which can be exerted by an apparatus under predetermined transportation condition. In practical operation, operation is performed under equal to or lower transportation capacity. Therefore, there may be the case of no-coincidence of transportation amount per unit hour in the whole transportation section with transportation capacity of each transportation apparatus described above. The above 4500 kg/hr, as transportation amount per unit hour in the whole transportation sections, means production rate of the water-absorbing resin powder substance.

The water-absorbing resin powder substance after the transportation test, which reached the final point F1 of the transportation section, had a CRC of 30.5 (g/g), an SFC of 29.8 ($\times 10^{-7} \cdot cm^3 \cdot s \cdot g^{-1}$) and an AAP of 25.2 (g/g). A reduction rate of SFC by transportation was 0.8%. Blocking phenomenon of the transportation pipeline was not observed. It should be noted that, when SFC before transportation and SFC after transportation are expressed as Sf1 and Sf2, respectively, the reduction rate Rs (%) of SFC can be calculated by the following expression.

$$Rs=\{(Sf1-Sf2)/Sf1\}\times 100 \qquad \text{[Expression 5]}$$

Example 2

A transportation test of the water-absorbing resin powder substance was performed using the water-absorbing resin powder substance B instead of the water-absorbing resin powder substance A. In this case, transportation capacity per unit hour of the transportation apparatus A in operation was 5673 kg/hr. Transportation capacity per unit hour of the transportation apparatus B in operation was 6010 kg/hr. Transportation capacity per unit hour of the transportation apparatus C in operation was 6340 kg/hr. Transportation amount per unit hour in the whole transportation sections was 4500 kg/hr. The transportation experiment was performed similarly as in Example 1 in other conditions. The water-absorbing resin powder substance after the transportation test, which reached the final point F1 of the transportation section, had a CRC of 30.0 (g/g), an SFC of 49.8 ($\times 10^{-7} \cdot cm^3 \cdot s \cdot g^{-1}$) and an AAP of 24.5 (g/g). A reduction rate of SFC by transportation was 0.4%. Blocking phenomenon of the transportation pipeline was not observed.

Comparative Example 1

A transportation test of the water-absorbing resin powder substance was performed using a similar transportation part as in Example 1, except that the transportation apparatus B and the transportation apparatus C were removed from the transportation part of Example 1, and from the start point B1 of the transportation section to the final point F1 of the transportation section was connected by one transportation pipeline P4. Length of the transportation pipeline was 105 m for the horizontal part, and 20 m for the vertical part. Terminal linear velocity Vy was 27.9 m/s at the terminal of the transportation pipeline P4. Transportation capacity per unit hour was 6984 kg/hr. The water-absorbing resin powder substance after the transportation test, which reached the final point F1 of the transportation section, had a CRC of 30.3 (g/g), an SFC of 26.3 ($\times 10^{-7} \cdot cm^3 \cdot s \cdot g^{-1}$) and an AAP of 24.9 (g/g). A reduction rate of SFC by transportation was 12.5%. Blocking phenomenon of the transportation pipeline was not observed.

Comparative Example 2

A transportation test was performed similarly as in Comparative Example 1, except that the terminal linear velocity Vy at the terminal of the transportation pipeline P4 was set at 9.9 m/s. As a result, blocking phenomenon generated during the test, and transportation was intermitted.

Comparative Example 3

A transportation experiment was performed similarly as in Comparative Example 1, except that the terminal linear velocity Vy at the terminal of the transportation pipeline P4 was set at 9.9 m/s, and the water-absorbing resin powder substance B was used instead of the water-absorbing resin powder substance A. As a result, blocking phenomenon generated during the test, and transportation was intermitted.

Example 3

Figure 8:
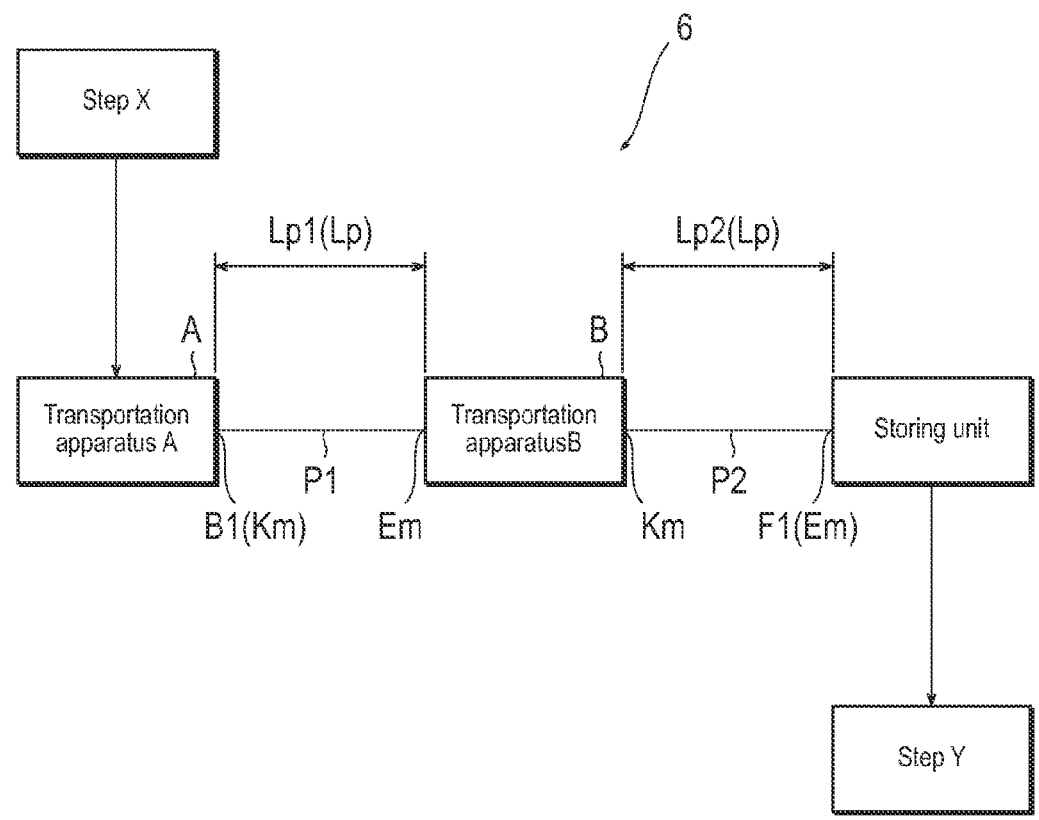
FIG. 8 is a schematic configuration view of a transportation part relevant to Example 3.

A transportation test of the water-absorbing resin powder substance was performed using a transportation part, which has transportation apparatus one unit less than the transportation part 6 shown in FIG. 4 and FIG. 5, and connecting two transportation apparatuses in series. The transportation part 6 used in Example 3 is shown in FIG. 8. The transportation apparatuses (A, B) shown in FIG. 8 are the same as the transportation apparatus used in Example 1. Testing time was about 7 minutes as total time required in performing each one time of transportation by each transportation machine.

As the water-absorbing resin powder substance, the water-absorbing resin powder substance B obtained in Production Example 2 was used. Inner diameter of the first transportation pipeline P1 and the second transportation pipeline P2 were both 83.1 mm. The transportation pipelines (P1, P2) each has a horizontal part and a vertical part, and length of the first transportation pipeline P1 was 40 m for the horizontal part, and 5 m for the vertical part. Length of the second transportation pipeline P2 was 39 m for the horizontal part, and 20 m for the vertical part. The terminal part of the second transportation pipeline P2 was connected to a storage hopper. Terminal linear velocity Vy was 11.4 m/s at the terminal Em of the transportation pipeline P1, and it was 8.3 m/s at the terminal Em of the transportation pipeline P2. Transportation capacity per unit hour of the transportation apparatus A in operation was 6329 kg/hr. Transportation capacity per unit hour of the transportation apparatus B in operation was 5330 kg/hr. Transportation amount per unit hour in the whole transportation sections was 4500 kg/hr. The water-absorbing resin powder substance after the transportation test, which reached the final point F1 of the transportation section, had a CRC of 30.0 (g/g), an SFC of 49.6 ($\times 10^{-7} \cdot cm^3 \cdot s \cdot g^{-1}$) and an AAP of 24.4 (g/g). A reduction rate of SFC by transportation was 0.8%. Blocking phenomenon of the transportation pipeline was not observed.

Comparative Example 4

A transportation part similar to that in Example 1 was used, except that the transportation apparatus B was removed from the transportation part of Example 3, and from the start point B1 of the transportation section to the final point F1 of the transportation section was connected by one transportation pipeline P5. Length of this transportation pipeline was 75 m for the horizontal part, and 20 m for the vertical part. Terminal linear velocity Vy was 19.4 m/s at the terminal of this transportation pipeline P5. Transportation capacity per unit hour was 6571 kg/hr. The water-absorbing resin powder substance after the transportation test, which reached the final point F1 of the transportation section, had a CRC of 30.2 (g/g), an SFC of 46.0 ($\times 10^{-7} \cdot cm^3 \cdot s \cdot g^{-1}$) and an AAP of 24.2 (g/g). A reduction rate of SFC by transportation was 8%. Blocking phenomenon of the transportation pipeline was not observed.

Comparative Example 5

A transportation experiment was performed similarly as in Comparative Example 4, except that the terminal linear velocity Vy at the terminal of the transportation pipeline P5 was set at 10 m/s. As a result, blocking phenomenon generated during the test, and transportation was intermitted.

Example 4

A transportation test of the water-absorbing resin powder substance was performed using the water-absorbing resin powder substance C instead of the water-absorbing resin powder substance A. Specifically, a transportation test of the water-absorbing resin powder substance was performed using a transportation part similar to the transportation part 6 shown in FIG. 4 and FIG. 5, and connecting three transportation apparatuses in series. Testing time was about 10 minutes as total time required in performing each one time of transportation by each transportation machine. Inner diameter of the transportation pipelines (P1, P2, and P3) was each 83.1 mm. The transportation pipelines (P1, P2, and P3) each has a horizontal part and a vertical part, and length of the transportation pipeline P1 was 38 m for the horizontal part, and 5 m for the vertical part. Length of the transportation pipeline P2 was 34 m for the horizontal part, and 5 m for the vertical part. Length of the transportation pipeline P3 was 37 m for the horizontal part, and 20 m for the vertical part, and the terminal part of transportation pipeline P3 was connected to a storage hopper. Terminal linear velocity Vy was 9.9 m/s at the terminal Em of the transportation pipeline P1, it was 10.5 m/s at the terminal Ern of the transportation pipeline P2, and it was 11.5 m/s at the terminal Em of the transportation pipeline P3. Transportation capacity per unit hour of the transportation apparatus A in operation was 6151 kg/hr. Transportation capacity per unit hour of the transportation apparatus B in operation was 6580 kg/hr. Transportation capacity per unit hour of the transportation apparatus C in operation was 6940 kg/hr. Transportation amount per unit hour in the whole transportation sections was 4500 kg/hr. The water-absorbing resin powder substance after the transportation test, which reached the final point F1 of the transportation section, had a CRC of 27.0 (g/g), an SFC of 118 ($\times 10^{-7} \cdot cm^3 \cdot s \cdot g^{-1}$) and an AAP of 23.8 (g/g). A reduction rate of SFC by transportation was 1.7%. Blocking phenomenon of the transportation pipeline was not observed.

Comparative Example 6

A transportation part similar to that in Example 4 was used, except that the transportation apparatuses B and C were removed from the transportation part of Example 4, and from the start point B1 of the transportation section to the final point F1 of the transportation section was connected by one transportation pipeline P4. Length of this transportation pipeline was 105 m for the horizontal part, and 20 m for the vertical part. A transportation test of the water-absorbing resin powder substance was performed using the water-absorbing resin powder substance C. Terminal linear velocity Vy was 27.9 m/s at the terminal of this transportation pipeline P4. Transportation capacity per unit hour was 7350 kg/hr. The water-absorbing resin powder substance after the transportation test, which reached the final point F1 of the transportation section, had a CRC of 26.8 (g/g), an SFC of 102

($\times 10^{-7} \cdot cm^3 \cdot s \cdot g^{-1}$) and an AAP of 23.6 (g/g). A reduction rate of SFC by transportation was 15%. Blocking phenomenon of the transportation pipeline was not observed.

Comparative Example 7

A transportation experiment was performed similarly as in Comparative Example 6, except that the terminal linear velocity Vy at the terminal of the transportation pipeline P4 was set at 9.9 m/s. As a result, blocking phenomenon generated during the test, and transportation was intermitted.

Example 5

A transportation test of the water-absorbing resin powder substance was performed using the water-absorbing resin powder substance (3) containing a recycled product of the fine powders obtained in Production Example 4, instead of the water-absorbing resin powder substance C, in Example 4. As a result, regeneration of the fine powders caused by transportation was substantially little, and blocking phenomenon of the transportation pipeline was not observed.

Comparative Example 8

A transportation experiment of the water-absorbing resin powder substance was performed using the water-absorbing resin powder substance (3) containing a fine powder recycled product obtained in Production Example 4, in Comparative Example 6. As a result, regeneration of the fine powders and generation of powder dust caused by transportation were observed.

Specifications and evaluation results of Examples and Comparative Examples are shown in the following Table 1, Table 2 and Table 3.

TABLE 1

|  |  | Example 1 | Example 2 | Comparative Example 1 | Comparative Example 2 | Comparative Example 3 |
|---|---|---|---|---|---|---|
| Water-absorbing resin powder substance | | A | B | A | A | B |
| First transportation pipeline P1 | Length (m) | 43 | 43 | — | — | — |
| | Terminl linear velocity Vy (m/s) | 9.9 | 9.9 | — | — | — |
| Second transportation pipeline P2 | Length (m) | 39 | 39 | — | — | — |
| | Terminl linear velocity Vy (m/s) | 10.5 | 10.5 | — | — | — |
| Third transportation pipeline P3 | Length (m) | 57 | 57 | — | — | — |
| | Terminl linear velocity Vy (m/s) | 11.5 | 11.5 | — | — | — |
| Single transportation pipeline P4 | Length (m) | — | — | 125 | 125 | 125 |
| | Terminl linear velocity Vy (m/s) | — | — | 27.9 | 9.9 | 9.9 |
| Transportation amount per unit hr (kg/hr) | | 4500 | 4500 | 6984 | Clogging | Clogging |
| Reduction rate of SFC Rs (%) | | 0.8 | 0.4 | 12.5 | — | — |

TABLE 2

|  |  | Example 3 | Comparative Example 4 | Comparative Example 5 |
|---|---|---|---|---|
| Water-absorbing resin powder substance | | B | B | B |
| First transportation pipeline P1 | Length (m) | 45 | — | — |
| | Terminl linear velocity Vy (m/s) | 11.4 | — | — |
| Second transportation pipeline P2 | Length (m) | 59 | — | — |
| | Terminl linear velocity Vy (m/s) | 8.3 | — | — |
| Single transportation pipeline P5 | Length (m) | — | 95 | 95 |
| | Terminl linear velocity Vy (m/s) | — | 19.4 | 10.0 |
| Transportation amount per unit hr (kg/hr) | | 4500 | 6571 | Clogging |
| Reduction rate of SFC Rs (%) | | 0.8 | 8.0 | — |

TABLE 3

|  |  | Example 4 | Comparative Example 6 | Comparative Example 7 |
|---|---|---|---|---|
| Water-absorbing resin powder substance | | C | C | C |
| First transportation pipeline P1 | Length (m) | 43 | — | — |
| | Terminl linear velocity Vy (m/s) | 9.9 | — | — |
| Second transportation pipeline P2 | Length (m) | 39 | — | — |
| | Terminl linear velocity Vy (m/s) | 10.5 | — | — |
| Third transportation pipeline P3 | Length (m) | 57 | — | — |
| | Terminl linear velocity Vy (m/s) | 11.5 | — | — |
| Single transportation pipeline P4 | Length (m) | — | 125 | 125 |
| | Terminl linear velocity Vy (m/s) | — | 27.9 | 9.9 |
| Transportation amount per unit hr (kg/hr) | | 4500 | 7350 | Clogging |
| Reduction rate of SFC Rs (%) | | 1.7 | 15.0 | — |

As is shown in the above results, Examples have high evaluation as compared with Comparative Examples. From these results, superiority of the present invention is obvious.

INDUSTRIAL APPLICABILITY

The transportation method for a water-absorbing resin powder substance relevant to the present invention can be applied suitably in the production step of the water-absorbing resin powder substance utilized in hygiene materials containing absorbing bodies such as, for example, disposable diapers or sanitary napkins, incontinent pads and the like.

The invention claimed is:

1. A transportation method for conveying a water-absorbing resin powder substance during production thereof, the method comprising a step of pneumatically transporting the water-absorbing resin powder substance via transportation pipelines, wherein two or more plug-forming pneumatic transportation apparatuses connected by the transportation pipelines in series are used in one transportation section for plug-forming pneumatic transportation.

2. The transportation method according to claim 1, wherein a total length Lt of the transportation pipelines included in the one transportation section is equal to or longer than 50 m.

3. The transportation method according to claim 1, wherein a length Lp of each transportation pipeline included in the one transportation section is equal to or shorter than 40 m.

4. The transportation method according to claim 1, wherein a linear velocity at a terminal of the transportation pipeline of the water-absorbing resin powder substance is equal to or lower than 15 m/s.

5. The transportation method according to claim 1, wherein the two or more plug-forming pneumatic transportation apparatuses each have a pressurized tank and a receiving hopper.

6. The transportation method according to claim 5, wherein a valve is provided between the pressurized tank and the receiving hopper, and operation of the valve and start-up of the two or more plug-forming pneumatic transportation apparatuses are automatically controlled, based on the powder level in the receiving hopper.

7. The transportation method according to claim 5, wherein a valve is provided between the pressurized tank and the receiving hopper, and operation of the valve and start-up of the two or more plug-forming pneumatic transportation apparatuses are automatically controlled, based on the pressure in the pressurized tank.

8. The transportation method according to claim 1, wherein a total length Lt of the transportation pipelines included in the one transportation section is equal to or longer than 100 m.

9. The transportation method according to claim 1, wherein the two or more plug-forming pneumatic transportation apparatuses are each a pneumatic transportation apparatus in high concentration.

10. The transportation method according to claim 1, comprising a step for storing the water-absorbing resin powder substance pneumatically transported.

11. The transportation method according to claim 1, wherein a transportation amount of the water-absorbing resin powder substance is equal to or higher than 1000 kg/hr.

12. The transportation method according to claim 1, wherein the water-absorbing resin powder substance has been surface cross-linked with a polyhydric alcohol.

13. The transportation method according to claim 1, wherein the water-absorbing resin powder substance comprises a polyvalent metal salt.

14. The transportation method according to claim 1, wherein the water-absorbing resin powder substance comprises an inorganic particle.

15. The transportation method according to claim 1, wherein the saline flow conductivities of a 0.69% by mass normal saline solution of the water-absorbing resin powder substance before and after transportation are each equal to or larger than 10 ($\times 10^{-7} \cdot cm^3 \cdot s \cdot g^{-1}$).

16. The transportation method according to claim 1, wherein the water-absorbing resin powder substance is a pulverized irregularly shaped polyacrylic acid (salt)-based water-absorbing resin obtained by continuous belt polymerization or continuous kneader polymerization.

17. The transportation method according to claim 1, wherein the water-absorbing resin powder substance is a polyacrylic acid (salt)-based water-absorbing resin obtained by a production step comprising a fine powder recycling step.

18. The transportation method according to claim 1, wherein the water-absorbing resin powder substance is a polyacrylic acid (salt)-based water-absorbing resin produced by a process including surface cross-linking at 150 to 250° C.

19. The transportation method according to claim 2, wherein a length Lp of each transportation pipeline included in the one transportation section is equal to or shorter than 40 m.

20. The transportation method according to claim 2, wherein a linear velocity at a terminal of the transportation pipeline of the water-absorbing resin powder substance is equal to or lower than 15 m/s.

* * * * *